United States Patent [19]

Lincoln et al.

[11] 3,854,956
[45] Dec. 17, 1974

[54] DYESTUFFS AND SPECTRAL SENSITIZERS FOR SILVER HALIDE

[75] Inventors: Lewis L. Lincoln; Donald W. Heseltine, both of, Rochester, N.Y.

[73] Assignee: Eastman Kodak Company, Rochester, N.Y.

[22] Filed: Oct. 30, 1970

[21] Appl. No.: 85,707

[52] U.S. Cl. .................................. 96/131, 260/240
[51] Int. Cl. ....... G03c 1/16, G03c 1/18, G03c 1/20
[58] Field of Search ...................................... 96/131

[56] References Cited
UNITED STATES PATENTS

| | | | |
|---|---|---|---|
| 2,776,280 | 1/1957 | Brooker et al. | 96/131 X |
| 2,921,067 | 1/1960 | Larive et al. | 96/131 X |
| 3,501,309 | 3/1970 | Gilman et al. | 96/131 |

*Primary Examiner*—David Klein
*Attorney, Agent, or Firm*—M. R. Chipaloski

[57] ABSTRACT

Polymethine dyes, including cyanine, carbocyanine, dicarbocyanine, merocyanine and styryl dyes, are useful as photographic silver halide sensitizing dyes and are prepared from reactive heterocyclic quaternary salts, such as 2-methyl-3-formylethyl benzothiazolium iodide, by dye condensation techniques. These dyes are N-substituted with groups including an N,α-alkenylene bridge and alkyl groups whose terminal carbon atom is additionally substituted with acyl, sulfo, 1-hydroxy-1-sulfoalkyl, acetal and thioacetal groups including cyclic species and 1-hydrazonoalkyl groups. The dyes containing reactive hydrazonoalkyl substituents are advantageous when used in conjunction with internal image emulsions, such as in the preparation of direct-print photographic elements.

17 Claims, No Drawings

DYESTUFFS AND SPECTRAL SENSITIZERS FOR SILVER HALIDE

This invention relates to photography and particularly to photographic silver halide sensitizing dyes, especially those derived from reactive N-substituted, 2-alkyl heterocyclic quaternary salts.

Dyestuffs, including certain cyanine dyes, carbocyanine dyes, dicarbocyanine dyes, merocyanine dyes and styryl dyes, are known in the art and known to be useful as spectral sensitizing dyes for photographic silver halide.

Heretofore, however, conventional spectral sensitizing dyes have often been characterized by a lack of compatibility with other included components of complex silver halide emulsions. As an example, it is thought that in emulsions where chemical components additional to the dye are desirably adsorbed to the silver halide grain surface there is competition between these compounds and the spectral sensitizing dye for position on the grain surface. To overcome the low adsorption it is generally necessary to employ higher chemical concentrations, and this can cause undesirable sensitometric effects such as contamination of processing solutions, image staining and the like. It is desirable then to provide spectral sensitizing dyes that also possess additional functional capabilities, i.e., as halogen acceptors in direct print emulsions or the like. In this manner, the second chemical component, which is thought to compete with the dye for a position on the silver halide grain, can be decreased in concentration or deleted since the dye can either assist in performing its function or assume it completely. Also, building multiple functions into a spectral sensitizing dye enables one to simplify coating formulations and thereby produce photographic elements more conveniently.

Accordingly, it is an object of this invention to provide new polymethine cyanine, carbocyanine, dicarbocyanine, merocyanine and styryl dyes.

Another object of the present invention is to provide new photographic silver halide polymethine sensitizing dyes that are derived from reactive, N-substituted cyclammonium quaternary salts.

Still an additional object of the instant invention is to provide novel photographic silver halide emulsions, including internal image emulsions, containing new polymethine dyes including cyanine, carbocyanine, dicarbocyanine, merocyanine and styryl dyes.

Still another object of the present invention is to provide a novel process for the preparation of cyclized, N,α-alkenylene dyes.

Yet additional objects of this invention will become apparent from a reading of the following specification and appended claims.

The objects of this invention are accomplished with polymethine dyes comprising two terminal nuclei including at least one heterocyclic nucleus of the type used in cyanine dyes, the nucleus having a nitrogen atom joined to a polymethine carbon chain linkage intervening the terminal nuclei and including at least one nuclear carbon of the heterocyclic nucleus, the nitrogen atom having substituted thereon a member selected from either:

A. a member having the formula —$CH_2$—$_n$R wherein:
1. n represents a positive integer of from 2 to 6 and
2. R represents a member selected from either
   a. an acyl radical
   b. a radical having the formula

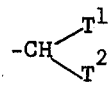

wherein $T^1$ and $T^2$, when taken alone, each represents a member selected from either an alkoxy radical or an alkylthio radical, and $T^1$ and $T^2$, when taken together, represent the atoms necessary to complete a cyclic acetal selected from either cyclic thioacetals or cyclic oxyacetals containing from 5 to 6 atoms in the heterocyclic acetal ring,
   c. a 1-hydroxy-1-sulfoalkyl radical, and
   d. a 1-hydrazonoalkyl radical, and
B. in dyes having an α-methine carbon atoms, a member having the formula —$CH_2$—CH=CH—, linking the nitrogen atom to the α-methine carbon atom, i.e., a 1,3-prop-2-enylene radical.

The cyclic acetal or cyclic thioacetal radicals formed by $T^1$ and $T^2$ include cyclic acetal radicals such as, for example, 1,3-diothiolan-2-yl, 1,3-dioxolan-2-yl, 1,3-dithian-2-yl, 1,3-dioxan-2-yl and the like. Additionally, 1-hydrazonoalkyl radicals as represented herein include substituted 1-hydrazonoalkyl radicals such as a thiosemicarbazonomethyl radical, a phenylhydrazonoalkyl radical like phenylhydrazonomethyl, 1-phenylhydrazonopropyl, p-tolylhydrazonomethyl and 1-(p-sulfophenylhydrazono)ethyl, a 2-benzothiazolylhydrazonomethyl radical and the like 1-hydrazonoalkyl radicals.

Additionally, the 1-hydroxy-1-sulfoalkyl include such members as those having alkyl radicals as are described elsewhere herein and preferably alkyl radicals having from 1–2 carbon atoms. It is also understood that in the case of particular dyes, the sulfo radical can be in its salt form. In merocyanine dyes, for example, the appropriate sulfo radical can be an alkali metal salt such as a sodiosulfo radical. Also, with certain cyanines having symmetrical 1-hydroxy-1-sulfoalkyl substitution, one such radical can exist in its salt form, i.e, as other than an internal salt, to form, for example, an alkali metal salt such as a monosodium salt. Also, the designation α-methine carbon atom refers to an extranuclear methine carbon atom that is directly attached to an azomethine carbon in a heterocyclic nucleus of the type used in cyanine dyes.

Polymethine dyes, as defined herein, include polymethine dyestuffs having an amidinium-ion system such as cyanine dyes including simple cyanine, carbocyanine, dicarbocyanine, etc., cyanine dyes wherein the prefix defines the length of the conjugated polymethine carbon bridge, as well as holopolar cyanines, hemicyanines, trinuclear cyanines, p-dialkylaminostyryl dyes and the like dye classes. Also included herein as defined by the term polymethine dyes are non-ionized, undissociated dyes containing the amidic system such as merocyanine dyes. Dyes of each of these two systems are conveniently designated herein as polymethine dyes since they exhibit a common characteristic, that being the presence of at least one nitrogen-containing heterocyclic nucleus which is joined to a conjugated polymethine carbon chain or linkage by a carbon atom of the heterocyclic nucleus.

Exemplary polymethine dyes include dyes such as those having the formulas:

I. 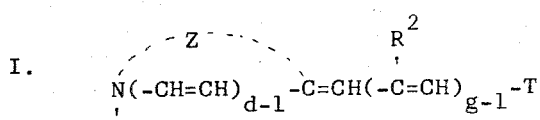

II. 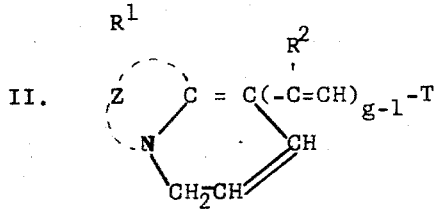

III. 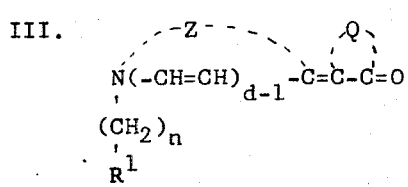

IV. 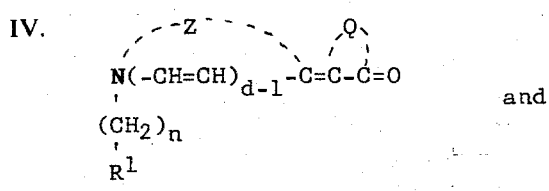 and

V. 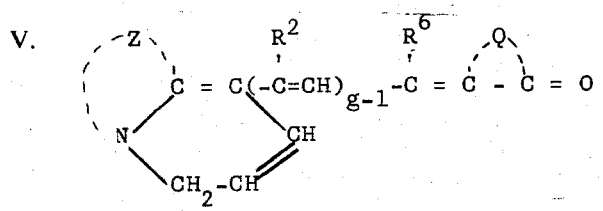

wherein:
- a. Z represents the non-metallic atoms necessary to complete a heterocyclic nucleus of the type used in cyanine dyes,
- b. $d$ represents a positive integer having a value of from 1 to 2,
- c. $n$ represents an integer as defined above,
- d. $g$ represents a positive integer having a value of from 1 to 3,
- e. T represents a member which is either:
  1. a heterocyclyl radical including a heterocyclic nucleus containing a nitrogen atom having substituted thereon a radical of the formula $(CH_2)_nR^5$ wherein $n$ is as defined above and $R^5$ is as defined below, and having in the heterocyclic nucleus the additional non-metallic atoms to complete a heterocyclic nucleus of the type used in cyanine dyes, and
  2. a heterocyclylidenemethyl radical having in the heterocyclic nucleus the non-metallic atoms, including the carbon atom of a keto group, necessary to complete a heterocyclic nucleus of the type used in merocyanine dyes, the keto group furnishing the carbonyl end of the amidic system.
- f. each of $R^1$ and $R^5$ represents an organic substituent and, when the dye molecule is free from an N,α-alkenylene bridge, at least one of $R^1$ and $R^5$ represents a member selected from either:
  1. an acyl radical,
  2. a radical having the formula

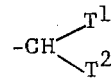

wherein $T^1$ and $T^2$ are as defined previously,
3. a 1-hydroxy-1-sulfoalkyl radical or
4. a 1-hydrazonoalkyl radical
- g. each of $R^2$, $R^3$ and $R^4$ represents either a hydrogen atom, an alkyl radical or an aryl radical, and preferably methyl, ethyl or phenyl,
- h. $X^-$ represents an anion including a wide variety of such anions as halide anions like bromide, chloride and iodide, as well as additional anions, e.g., sulfates including sulfate, hydrosulfate and lower alkylsulfates like methylsulfate, ethylsulfate, aromatic sulfonates such as p-toluenesulfonate and benzenesulfonate, acid anions derived from carboxylic acids like acetate, trifluoroacetate, propionate and a wide variety of other anions including anions such as, for example, perchlorate, cyanate, thiocyanate, sulfamate, benzoate, etc., and
- i. Q represents the non-metallic atoms necessary to complete a heterocyclic nucleus containing from 5 to 6 atoms in the heterocyclic ring, 3 to 4 of said atoms being carbon and 2 of said atoms being selected from nitrogen, oxygen or sulfur with at least one of said two atoms being nitrogen.

Of the polymethine dyes whose formulas are described hereinabove, advantageous members included are those wherein T represents a radical selected from a heterocyclyl radical having the formula:

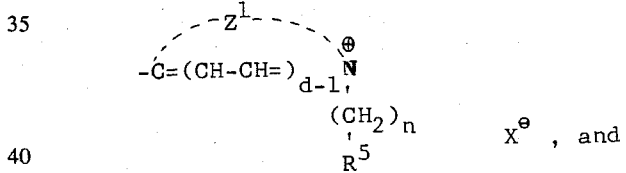

a heterocyclylidenemethyl radical having the formula:

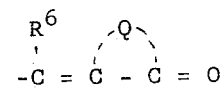

wherein $d$, $R^5$, Q and $X^-$ are as defined above and wherein:
- a. $Z^1$ represents the non-metallic atoms necessary to complete a heterocyclic nucleus of the type used in cyanine dyes, and
- b. $R^6$ represents a member selected from either a hydrogen atom, an alkyl radical or an aryl radical.

As defined herein, the term alkyl radical refers to straight and branched chain aliphatic radicals having from 1 to about 18 carbon atoms in the longest aliphatic chain (i.e., that chain which determines the radical nomenclature) such as methyl, ethyl, chloroethyl, phenethyl, propyl, isopropyl, n-butyl, isobutyl, tert-butyl, amyl, n-hexyl, n-heptyl, n-octyl, n-nonyl, n-decyl, dodecyl, tetradecyl, pentadecyl, heptadecyl, octadecyl and the like with alkyl radicals of from 1 to 8 carbon atoms being preferred. The designation alkoxy radical, as that term is used herein, refers to alkoxy radicals having from 1 to about 18 carbon atoms in the aliphatic chain and including methoxy, ethoxy, propoxy, n-butoxy, isobutoxy, pentyloxy, octyloxy, decyloxy, dodecyloxy, pentadecyloxy, octadecyloxy and the like. Acyl radicals, as herein defined, include those having the formula

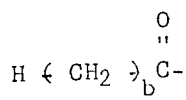

wherein $b$ is an integer having a value of from 0 to about 18 and including such acyl radicals as formyl, acetyl, propionyl, hexanoyl, octanoyl, decanoyl, lauroyl, tridecanoyl, pentadecanoyl, stearoyl and the like. Preferred acyl radicals include those having from 1 to 4 carbon atoms and especially formyl and acetyl. Aryl radicals are defined herein to include mono- and polycyclic aryl radicals having from 6 to 14 atoms in the nucleus, such as phenyl, p-tolyl, naphthyl, anthryl and the like. Heterocyclyl radicals useful herein include mono- and polycyclic aromatic radicals having from 5 to about 14 atoms, including at least one hetero atom, in the ring nucleus. The alkyl, alkoxy, acyl, aryl and heterocyclyl radicals useful herein are also advantageously substituted with an additional wide variety of chemical substituents.

Of the useful polymethine dyes recited herein are included particularly advantageous cyanine, carbocyanine and dicarbocyanine dyes having the formulas:

VI.

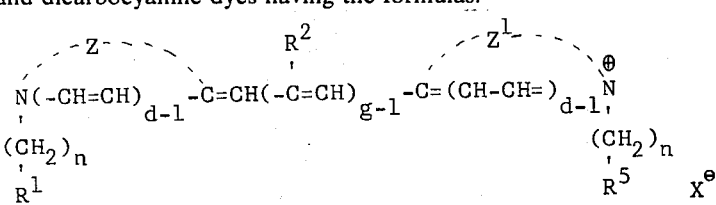

VII.

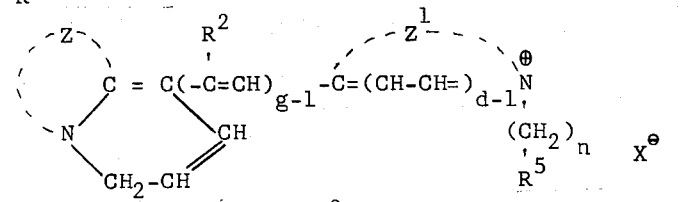

VIII.

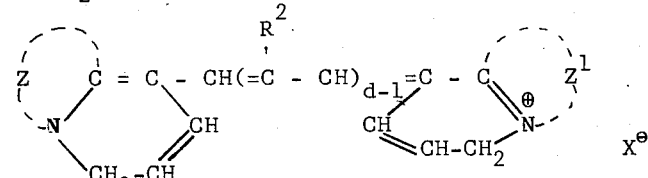

wherein:
a. each of $n$, $d$, X, and $R^2$ are as previously defined,
b. each of Z and $Z^1$ represent the non-metallic atoms necessary to complete a heterocyclic nucleus of the type used in the production of cyanine dyes, and more particularly, a heterocyclic nucleus having therein at least one atom selected from either nitrogen, oxygen, sulfur or selenium,
c. $g$ represents a positive integer having a value of from 1 to 3,
d. the organic substituent represented by each of $R^1$ and $R^5$ is selected from either
 1. a hydrogen atom,
 2. a hydroxyl radical,
 3. a carboxyl radical,
 4. a cyano radical,
 5. an acyl radical,
 6. an acyloxy radical,
 7. an alkoxy radical,
 8. a radical having the formula

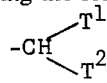

wherein $T^1$ and $T^2$, when taken alone, each represents a member selected from the group consisting of an alkoxy radical and an alkylthio radical, and $T^1$ and $T^2$, when taken together, represent the atoms necessary to complete a cyclic acetal selected from the group consisting of cyclic oxyacetals and cyclic thioacetals containing from 5 to 6 atoms in the heterocyclic acetal ring,
 9. a sulfo radical,
 10. a 1-hydroxy-1-sulfoalkyl radical,
 11. an aryl radical, and
 12. a 1-hydrazonoalkyl radical selected from
  a 1-(thiosemicarbazono)alkyl radical,
  a 1-(heterocyclylhydrazono)alkyl radical,
  a 1-(phenylhydrazono)alkyl radical,
  a 1-(N-arylcarbamoylhydrazono)alkyl radical or
  a 1-(arylsulfonylhydrazono)alkyl radical, and
  when the dye molecule is free from an N,α-alkenylene bridge, at least one of $R^1$ and $R^5$ represents a member selected from the group consisting of:
  1. a formyl radical
  2. a radical having the formula

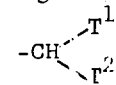

wherein $T^1$ and $T^2$, when taken alone, each represents a member selected from the group consisting of an alkoxy radical and an alkylthio radical, and $T^1$ and $T^2$, when taken together, represent the atoms necessary to complete a cyclic acetal selected from the group consisting of cyclic oxyacetals and cyclic thioacetals containing from 5 to 6 atoms in the heterocyclic acetal ring,
  3. a 1-hydroxy-1-sulfoalkyl radical, and
  4. a 1-hydrazonoalkyl radical.

The heterocyclic nuclei completed by Z and $Z^1$ atoms also include those containing a heterocyclic ring of from 5 to 6 atoms including a nitrogen atom and from 4 to 5 additional atoms of which from 3 to 4 atoms are carbon atoms and wherein the remaining additional atom is selected from either carbon, nitrogen, oxygen, sulfur or selenium atoms. The nitrogen atom is desirably substituted as described herein.

Exemplary heterocyclic nuclei completed by nonmetallic Z and $Z^1$ atoms include those nuclei of the indole series such as indolenine; those of the benzindole series like benz(e)indole and those of the naphthindole series such as naph(e)indole; those of the imidazole series such as benzimidazole compounds like 5-chlorobenzimidazole and also including compounds of the naphthimidazole series; those of the thiazole series like thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, etc.; those of the benzothiazole series such as benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.; those of the naphthothiazole series like naphtho[2,1-d]-thiazole, 8-methoxynaphtho[2,1-d]thiazole, 7-methoxynaphtho[2,1-d]thiazole, etc.; those of the thionaphtheno-7',6',4,5-thiazole series such as 4-methoxythionaphtheno-7',6',4,5-thiazole, etc.; those of the oxazole series for example, 4-methyloxazole, 5-methyloxazole, 4-phenyloxazole, 4,5-diphenyloxazole, 4-ethyloxazole, 4,5-dimethyloxazole, 5-phenyloxazole, etc.; those of the benzoxazole series like benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, etc.; those of the naphthoxazole series such as naphtho[2,1-d]oxazole, etc.; those of the selenazole series, for example, 4-methylselenazole, 4-phenylselenazole, etc., those of the benzoselenazole series like benzoselenazole, 5-chlorobenzoselenazole, 5-methoxybenzoselenazole, 5-hydroxybenzoselenazole, tetrahydrobenzoselenazole, etc.; those of the naphthoselenazole series such as naphtho[2,1-d]selenazole; and those of the quinoline series such as quinoline, 4-methylquinoline, 5-ethylquinoline, 6-chloroquinoline, 8-chloroquinoline, 6-methoxyquinoline, 8-hydroxyquinoline, 7-methyl-4-quinoline, isoquinoline, etc.

Of the radicals described previously as represented by

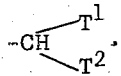

especially desirable radicals include those wherein $T^1$ and $T^2$, when taken alone, each represents either an alkoxy or an alkylthio radical, each having from 1 to 4 carbon atoms. Other advantageous radicals of this type, but where $T^1$ and $T^2$ are taken together, include those wherein $T^1$ and $T^2$ represent the atoms necessary to complete a cyclic oxyacetal or thioacetal radical such as 1,3-dithiolan-2-yl, 1,3-dioxolan-2-yl, 1,3-dithian-2-yl or 1,3-dioxan-2-yl.

Included within the previously described range of 1-hydrazonoalkyl radicals are such advantageous members as a. a phenylhydrazonomethyl radical,
b. a p-tolylhydrazonomethyl radical,
c. a p-sulfophenylhydrazonomethyl radical,
d. a thiosemicarbazonomethyl radical,
e. a 2-benzothiazolylhydrazonomethyl radical,
f. a p-carboxyphenylhydrazonomethyl radical,
g. a p-tolylsulfohydrazonomethyl radical,
h. a p-chlorophenylhydrazonomethyl radical,
i. a p-nitrophenylhydrazonomethyl radical,
j. an N-phenylcarbamoylhydrazonomethyl radical,
k. a 2,4-bis(methylsulfonyl)phenylhydrazonomethyl radical,
l. a 2,4-dinitrophenylhydrazonomethyl radical,
m. a 3-quinolylhydrazonomethyl radical,
n. a 1-(phenylhydrazono)ethyl radical,
o. a 1-(phenylhydrazono)propyl radical,
p. a 1-(p-tolylhydrazono)ethyl radical,
q. a 1-(2-benzothiazolylhydrazono)propyl radical,
r. a 1-(N-phenylcarbamoylhydrazono)butyl radical,
s. a 1-(p-toluenesulfonylhydrazono)ethyl radical, and
t. a 1-(p-sulfophenylhydrazono)propyl radical.

Especially desirable polymethine cyanine dyes, i.e., cyanine, carbocyanine, dicarbocyanine and the like dyes useful in the present invention are such dyes as:

a. a 3-ethyl-3'-(2-formylethyl)oxathiacarbocyanine salt,
b. a 3-(2-acetylethyl)-3'-ethyl-9-methylselenathiacarbocyanine salt,
c. a 5,5'-dichloro-3-ethyl-3'-(2-formylethyl)thiacarbocyanine salt,
d. a 3-ethyl-3'-(2-formylethyl)thiacarbocyanine salt,
e. a 3-ethyl-3',10-(1,3-prop-2-enylene)thiacarbocyanine salt,
f. a 3-ethyl-3',10-(1,3-prop-2-enylene)oxathiacarbocyanine salt,
g. a 3-propoxyethyl-3',10-(1,3-prop-2-enylene)thiacarbocyanine salt,
h. a 3'-ethyl-3,8-(1,3-prop-2-enylene)-5',6'-benzothiacarbocyanine salt,
i. a 3,3'-bis(3,3-diethoxypropyl)thiacarbocyanine salt,
j. a 3,3'-bis(3,3-diethoxypropyl)thiadicarbocyanine salt,
k. a 3,3'-bis(2-acetylethyl)-9-ethyloxaselenacarbocyanine salt,
l. a 3,3'-bis(2-acetylethyl)selenadicarbocyanine salt,
m. a 3,3'-bis(2-acetylethyl)thiadicarbocyanine salt,
n. a 3-ethyl-3'-(3,3-diethoxypropyl)-5,6-benzothiacarbocyanine salt,
o. a 3,3'-bis-(2-formylethyl)-5,5'-dimethoxythiacarbocyanine salt,
p. a 3,3'-bis-(2-formylethyl)-5,6,5',6'-tetramethoxythiadicarbocyanine salt,
q. a 3,3'-bis(3,3-diethoxypropyl)selenacarbocyanine salt,
r. a 3-[3,3-di(methylthio)propyl]-3'-ethylselenathiacyanine salt,
s. a 3,3'-bis(2-formylethyl)selenadicarbocyanine salt,
t. a 3,3'-bis-(2-formylethyl)oxaselenacarbocyanine salt,
u. a 3-(2-formylethyl)-3'-ethyl-9-methylselenathiacarbocyanine salt,
v. a 3-(2-formylethyl)-3'-phenyl-9-phenyloxathiacarbocyanine salt,
w. a 3-sulfopropyl-3',10-(1,3-prop-2-enylene)thiacarbocyanine salt,
x. a 3-cyanopropyl-3',10-(prop-2-enylene)thiacarbocyanine salt,
y. a 3-carboxyethyl-3',10-(prop-2-enylene)oxaselenacarbocyanine salt,
z. a 3-(2-formylethyl)-3'-benzoyloxyethylthiacarbocyanine salt,
aa. a 3-(1,3-dithian-2-ylethyl)-3'-ethyloxathiacarbocyanine salt,
bb. a 3-(1,3-dioxan-2-ylbutyl)-3'-hydroxymethyloxacyanine salt,
cc. a 3,3'-bis(3-phenylhydrazonopropyl)thiacarbocyanine salt,
dd. a 3,3'-bis(3-phenylhydrazonopropyl)thiadicarbocyanine salt,
ee. a 3-ethyl-3'-(3-phenylhydrazonopropyl)oxathiacarbocyanine salt,
ff. a 3-ethyl-9-methyl-3'-(3-phenylhydrazonopropyl)thiacarbocyanine salt,
gg. a 3-ethyl-3'-(3-thiosemicarbazonopropyl)thiacyanine salt,
hh. a 1'-ethyl-3-(3-thiosemicarbazonopropyl)thia-2'-cyanine salt,
ii. a 3-ethyl-3'-(3-thiosemicarbazonopropyl)thiacarbocyanine salt,
jj. a 3-ethyl-3'-(3-thiosemicarbazonopropyl)oxathiacarbocyanine salt,
kk. a 3-(2-acetylethyl)-3'-ethylselenathiacyanine salt,
ll. a 3,3'-bis(2-acetylethyl)selenacarbocyanine salt,
mm. an anhydro-3,3'-bis-(3-hydroxy-3-sulfopropyl)-thiacarbocyanine salt, monosodium salt,
nn. an anhydro-3-ethyl-3'-(3-hydroxy-3-sulfopropyl)thiacyanine salt,
oo. an anhydro-3-ethyl-3'-(3-hydroxy-3-sulfopropyl)oxathiacarbocyanine salt,
pp. a 3-ethyl-9-methyl-3'-(3-thiosemicarbazonopropyl)thiacarbocyanine salt,
qq. a 3,3'-bis[3-(2-benzothiazolylhydrazono)propyl]-thiacarbocyanine salt,
rr. a 3-ethyl-9-phenyl-3'-[3-(2,4-dinitrophenylhydrazono)propyl]selenacarbocyanine salt,
ss. a 3,3'-bis[3-(phenylcarbamoylhydrazono)butyl]-thiacarbocyanine salt,
tt. a 3,3'-bis(3-phenylhydrazonopentyl)benz[e]indolocarbocyanine salt,
uu. a 3,3'-bis[3-(2-quinolylhydrazono)propyl]oxathiacarbocyanine salt,
vv. a 3-ethyl-3'-[3-(p-chlorophenylhydrazono)butyl]1,1'-dimethylnaphth[1,2-d]imidazolocarbocyanine salt, and
ww. a 1'-ethyl-4'-methyl-3-{3-(p-toluenesulfonylhydrazono)butyl}thia-2'-cyanine salt, Other polymethine dyes of the subject invention include merocyanine dyes such as those having the formulas:

IX.
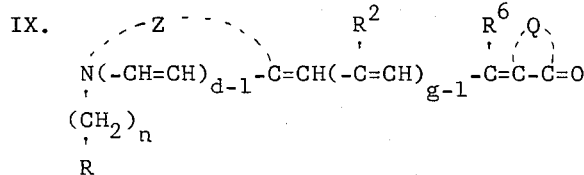

X.
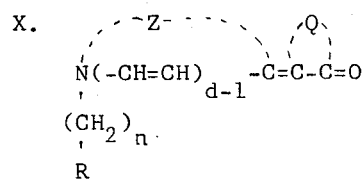

XI.
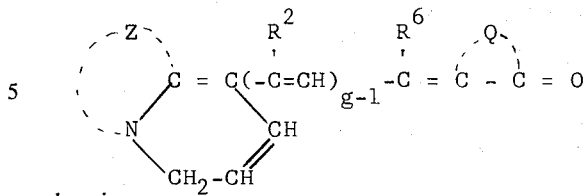

wherein:
A, $g$, $n$, $d$, Q, R, $R^2$ and $R^6$ are as defined above.

In the merocyanine dyes described herein, advantageous heterocyclic nuclei completed by the nonmetallic atoms represented herein by Q include those of the thiazolone series, for example 2-thiazolin-4-one; those of the 2,4-thiazolidinedione series such as 2,4-thiazolidinedione, 3-alkyl-2,4-thiazolidinediones (e.g. 3-ethyl-2,4-thiazolidinedione, etc.) 3-phenyl-2,4-thiazolidinedione, 3-α-naphthyl-2,4-thiazolidinedione, etc., those of the 2-thio-2,4-thiazolidinedione (rhodanine) series, such as 3-alkyl-2-thio-2,4-thiazolidinedione (3-alkylrhodanines), (e.g., 3-ethyl-2-thio-2,4-thiazolidinedione (or 3-ethylrhodanine), 3-phenyl-2-thio-2,4-thiazolidinedione (3-phenylrhodanine), 3-α-naphthyl-2-thio-2,4-thiazolidinedione (3-α-naphthylrhodanine), 3-(1-benzothiazyl)-2-thio-2,4-thiazolidinedione(3-(1-benzothiazyl)-rhodanine, etc., those of the 2-thio-2,5-thiazolidinedione series, such as 3-alkyl (e.g. 3-methyl, 3-ethyl, etc.) -2-thio-2,5-thiazolidindiones, etc., those of the 2-alkylmercapto-2-thiazolin-4-one series, such as 2-ethylmercapto-2-thiazolin-4-one, etc., those of the thiazolidinone series, such as 4-thiazolidinone or its 3-alkyl (e.g., ethyl, etc.), 3-phenyl or 3-α-naphthyl derivatives, those of the 2-alkylphenylamino-2-thiazolin-4-one series (e.g. 2-ethylphenylamino-2-thiazolin-4-one, etc.), those of the 2-diphenylamino-2-thiazolin-4-one series; those of the 2-thiazolin-5-one series, such as 2-ethylthio-2-thiazolin-5-one, 2-benzylthio-2-thiazolin-5-one, etc., those of the oxazolone series, for example; those of the 2-thio-2,4-oxazolidinedione series, such as 3-alkyl-2-thio-2,4-oxazolidinediones (e.g., 3-ethyl-2-thio-2,4-oxazolidinedione, etc.), those of the 2-imino-4-oxazolidinone (pseudohydantoin) series, etc.; those of the 2-oxazolin-5-one series, such as 2-phenyl-2-oxazolin-5-one, 2-ethyl-2-oxazolin-5-one, etc., those of the 2-isoxazolin-5-one series, such as 3-phenyl-2-isoxazolin-5-one, etc., those of the imidazolone series, for example; those of the hydantoin series, such as hydantoin, or its 3-alkyl-(e.g., ethyl, propyl, etc.), 3-phenyl or 3-α-naphthyl derivatives as well as its 1,3-dialkyl (e.g., 1,3-diethyl,etc.), 1-alkyl-3-phenyl (e.g. 1-ethyl-3-phenyl, etc.), 1-alkyl-3-naphthyl (e.g. 1-ethyl-3-α-naphthyl, etc.), 1,3-diphenyl, etc. derivatives, those of the 2-thiohydantoin series, such as 2-thiohydantoin, or its 3-alkyl (e.g. 3-ethyl, etc.), 3-phenyl or 3-α-naphthyl derivatives as well as its 1,3-dialkyl (e.g. 1,3-diethyl, etc.) 1-alkyl-3-phenyl (e.g. 1-ethyl-3-phenyl, etc.), 1-alkyl-3-naphthyl (e.g. 1-ethyl-3-α-naphthyl), 1,3-diphenyl, etc. derivatives, those of the 2-alkylmercapto-2-imidazolin-5-one series, such as 2-n-propylmercapto-2-imidazolin-5-one; those of the thionaphthenone series, such as 2(3H)-benzothiophenone or 3(2H)-benzothiophenone; those of the pyrazolone sereis, such as 2-pyrazolin-5-one or its 1-alkyl (e.g., methyl, ethyl, etc.), 1-phenyl, 1-naphthyl (e.g. 1-α-naphthyl), 3-alkyl (e.g. methyl, ethyl, etc.), 3-phenyl, 3 -naphthyl(3-α-naphthyl), 1-alkyl-3-phenyl (e.g. 1-methyl-3-phenyl, etc.), 3-alkyl-1-phenyl (e.g. 3-methyl-1-phenyl, etc.), 1,3-dialkyl (e.g. 1,3-dimethyl,etc.), 1,3-diphenyl, etc. derivatives; those of the oxindole series, such as 3(2H)-indolinone and like five-membered heterocyclic nuclei; those of the 2,4,6-triketohexahydropyrimidine series, for example, barbituric acid (2,4,6-triketohexahydropyrimidine), 2-thiobarbituric acid (2-thio-2,4,6-triketohexahydropyrimidine), as well as their 1-alkyl (e.g. 1-ethyl, etc.), or 1,3-dialkyl-(1,3-diethyl, etc.) derivatives.

Especially advantageous merocyanine dyes include those wherein the heterocyclic nucleus completed by the atoms represented by Z is either an indole nucleus, an imidazole nucleus, an oxazole nucleus, a thiazole nucleus, a selenazole nucleus, or a quinoline nucleus, and wherein the heterocyclic nuclei completed by atoms represented by Q is either a thiazolone nucleus, a 2-thio-2,4-thiazolidinedione nucleus, a 2-thio-2,5-thiazolidinedione nucleus, a 2-alkylmercapto-2-thiazolin-4-one nucleus, a thiazolidinone nucleus, e.g., 4-thiazolidinone, a 2-alkylphenylamino-2-thiazolin-4-one nucleus, a 2-diphenylamino-2-thiazolin-4-one nucleus, a 2-thiazolin-5-one nucleus, a 2-thio-2,4-oxazolidinedione nucleus, a pseudohydantoin nucleus, a 2-oxazolin-5-one nucleus, a 2-isoxazolin-5-one nucleus, a hydantoin nucleus, a 2-thiohydantoin nucleus, a 2-alkylmercapto-2-imidazolin-5-one nucleus, a benzothiophenone nucleus, a 2-pyrazolin-5-one nucleus, an oxindole nucleus, a barbituric acid (2,4,6-triketohexahydropyrimidine) nucleus and a 2-thiobarbituric acid (2-thio-2,4,6-triketohexahydropyrimidine) and wherein n represents a positive integer having a value of 2.

Preferred merocyanine dyes of this invention include such dyes as:

a. 5-{[3-(3,3-diethoxypropyl)-2-benzothiazolinylidine]ethylidene}-3-ethylrhodanine,
b. 5- [3-(2-acetylethyl)-2-benzothiazolinylidene]-ethylidene -3-ethylrhodanine,
c. 5-{[3-(2-formylethyl)-2-benzothiazolinylidene]-ethylidene}-3-ethylrhodanine,
d. 5-{[3-(2-acetylethyl)-2-benzoselenazolinylidene]-ethylidene}-3-ethylrhodanine,
e. 3-ethyl-5-{[3-(3-thiosemicarbazonopropyl)-2-benzothiazolinylidene]ethylidene}rhodanine,
f. 3-ethyl-5-{[3-(3-phenylhydrazonopropyl)benzo-thiazolinylidene]ethylidene}rhodanine,
g. 3-ethyl-5-(1H-pyrido[2,1-b]benzothiazol-4-yl-methylene)rhodanine,
h. 5-{[3-(2-formylethyl)-2-benzothiazolinylidene]-ethylidene}-3-ethyl-1-phenyl-2-thiohydantoin,
i. 1,3-diethyl-5-{[3-(3-thiosemicarbazonopropyl)2-benzothiazolinylidene]ethylidene}barbituric acid.
j. 3-ethyl-5-[3-(2-formylethyl)-2-benzoselenazolidene]rhodanine,
k. 5-[3-(3,3-Dimethoxypropyl)-2-benzothiaizolinylidene]-3-ethyl-1-phenyl-2-thiohydantoin,
l. 1,3-Diethyl-5-[3-(3-p-sulfophenylhydrazonopropyl)-2-benzothiazolinylidene]-2-thiobarbituric acid,
m. 5-[3-(3-Hydroxy-3-sulfopropyl)-2-benzothiazolinylidene]-3-phenylrhodanine.

Other advantageous polymethine dyes of this invention include styryl dyes such as those having the formulas:

XII. 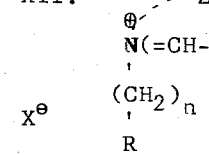 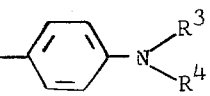

XIII.  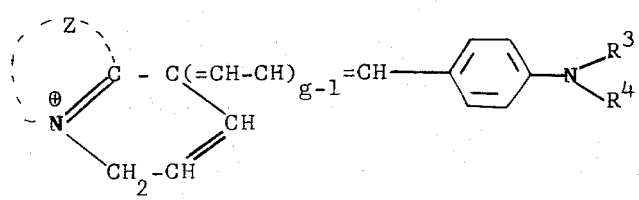

wherein Z, X⁻, n, R, R³ and R⁴ are as defined above, and g represents an integer of from 1 to 2. Especially advantageous styryl dyes include those wherein n is 2, wherein the heterocyclic nuclei completed by the atoms represented by Z is either an indole nucleus, an imidazole nucleus, an oxazole nucleus, a thiazole nucleus, a selenazole nucleus or a quinoline nucleus such as those described hereinabove, and wherein the hydrazonomethyl radical represented by R is either a thiosemicarbazonomethyl radical, a phenylhydrazonomethyl radical, a p-tolylhydrazonomethyl radical, a p-sulfophenylhydrazonomethyl radical and a 2-benzothiazolyl radical.

Preferred styryl dyes include such dyes as:

a. a 3-(3,3-diethoxypropyl)-2-p-dimethylaminostyrylbenzothiazolium salt,
b. a 3-(2-acetylethyl)-2-p-dimethylaminostyrylbenzothiazolium salt,
c. an anhydro-2-p-dimethylaminostyryl-3-(3-hydroxy-3-sulfopropyl)benzothiazolium salt,
d. a 3-(2-formylethyl)-2-p-dimethylaminostyrylbenzothiazolium salt,
e. a 3-(2-acetylethyl)-2-p-dimethylaminostyrylbenzoselenazolium salt,
f. a 3-(2-formylethyl)-2-p-dimethylaminostyrylbenzoselenazolium salt,
g. a 2-p-dimethylaminostyryl-3-(3-thiosemicarbazonopropyl)benzothiazolium salt,
h. a 2-p-dimethylaminostyryl-3-(3-phenylhydrazonopropyl)benzothiazolium salt,
i. a 4-dimethylaminobenzylidene-1,4-dihydropyrido[2,1-b]benzothiazolium salt, and
j. a 4-diethylaminobenzylidene-1,4-dihydropyrido[2,1-b]benzothiazolium salt.

The polymethine dyes of this invention, including cyanine, merocyanine and styryl dyes, are prepared from N-substituted cyclammonium quaternary salts including those having the formula:

XIV. 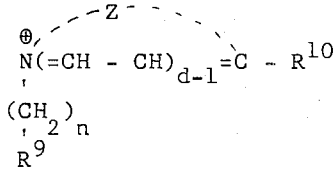

wherein:
a. each of Z, d and n are as defined above,
b. $R^9$ represents a member selected from either an acyl radical such as formyl, a radical having the formula

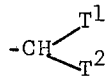

wherein $T^1$ and $T^2$ are as described hereinabove, a 1-hydroxy-1-sulfoalkyl radical or a 1-hydrazonoalkyl radical such as those previously described herein, and
c. $R^{10}$ represents an alkyl radical, typically having from 1 to 4 carbon atoms such as methyl, ethyl, propyl and butyl, and in the case of simple merocyanine dyes, $R^{10}$ represents either an alkylthio radical, an arylthio radical, a halo radical or a sulfo radical.

Preparation of these reactive cyclammonium quaternary salts is comprehensively described in the Lincoln and Heseltine application entitled REACTIVE QUATERNARY SALTS AND PHOTOGRAPHIC ELEMENTS, Ser. No. 28,041, filed April 13, 1970, now U.S. Pat. No. 3,615,615 issued Oct. 26, 1971. Their synthesis is conveniently effected by the reaction of hydro salt of a heterocyclic alkyl base with an aliphatic organic compound having ethylenic unsaturation between the first and second carbon atoms. The reaction medium is advantageously an inert solvent that exhibits moderate polarity and dissolves both the acid anion and the quaternary salt reagents, but which is not a solvent for the reaction product. Exemplary such media are such solvents as acetonitrile and dimethylacetamide. No reaction catalysts are generally required and the reaction temperature is conventionally variable from about 20°C. to about 30°C., although wider reaction temperatures can be employed, e.g. reflux conditions, so long as the reagents remain in solution and are not subjected to heating in excess of their decomposition temperatures. The reaction products either precipitate from solution spontaneously or can be precipitated such as by addition of ether and can then be purified by such conventional means as solvent washes or crystallization. As a specific example, 3-(2formylethyl)-2-methylbenzoselenazolium bromide is prepared by reacting 2-methylbenzoselenazolium hydrobromide and acrolein in dimethylacetamide as a solvent. The reaction is carried out at about 20°C. (room temperature) and the reaction product is obtained as a precipitate.

In accordance with the present invention, the herein described quaternary salts can be utilized to prepare polymethine dyes including cyanine, carbocyanine, dicarbocyanine, merocyanine and styryl dyes. Such dye preparations are conventionally accomplished by means of typical dye condensation reactions.

Cyanine dyes described above which are free from an N,α-alkenylene bridge can be prepared by reacting a cyclammonium quaternary salt, such as of Formula XII with a suitable agent. Symmetrical cyanine dyes are conveniently prepared by reacting the quaternary salt with an ortho ester such as diethoxymethyl acetate, ethyl orthoformate, ethyl orthoacetate, ethyl orthopropionate, 1,3,3-trimethoxypropene, etc. By suitably substituting the ortho ester, for example as noted previously, carbon atoms of the conjugated methine chain can be advantageously substituted with a variety of substituents such as alkyl radicals, and aryl radicals like those described above.

Symmetrical and non-symmetrical cyanine dyes are prepared by reacting a quaternary salt such as that of Formula XII with an intermediate such as one having the formula:

XV. 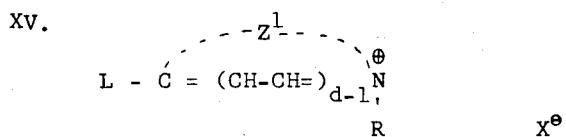

wherein $d$, R, $Z_1$ and $X^-$ are described above and L represents either a vinyl radical itself substituted with either a halogen atom such as chlorine, an alkyl or arylthio group (e.g. methylthio, ethylthio, phenylthio and additionally with alkyl or aryl radicals, etc.) or represents the group

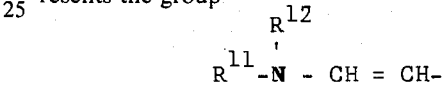

wherein $R^{11}$ represents an acyl radical such as acetyl, propionyl, butyryl, benzoyl, etc. (e.g., and acyl group having from 2 to 7 carbon atoms), and $R^{12}$ represents either a hydrogen atom, an alkyl radical or an aryl radical such as those described hereinabove.

These reactions used to prepare the cyanine dyes are advantageously accelerated by heating the reaction mixture, with temperatures varying from room temperature to reflux temperature of the reaction mixture being satisfactory. The reactions can be carried out in the presence of an inert diluent such as nitrobenzene, ethanol, n-propanol, butylrolactone, acetonitrile, chloroform, dimethylformamide, pyridine, acetic anhydride, dimethylacetamide, etc. After dye formation, the resultant product is typically obtained and purified by filtration and recrystallization from an inert diluent such as an alcohol like methanol or ethanol.

Merocyanine dyes of this invention, other than simple merocyanines, which are free from an N,α-alkenylene bridge are conveniently prepared by condensing a quaternary salt of Formula XIV with an intermediate having the formula:

XVI. 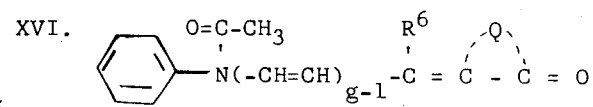

wherein Q, g and $R^6$ are previously defined. The condensation can advantageously be carried out in the presence of a basic condensing agent, e.g. the organic tertiary amines, such as triethylamine, tri-n-propylamine, triisopropylamine, tri-n-butylamine, etc., N-methylpiperidine, N-ethylpiperidine, N,N-dimethylaniline, N,N-diethylaniline, etc. The condensations can advantageously be effected in the presence of an inert solvent, e.g. ethanol, n-propanol, isopropanol, 1,4-dioxane, pyridine, quinoline, etc. Heating accelerates the condensations and temperatures varying from room temperature to the reflux temperature of the solvent in the reaction mixture are used. Simple merocyanine dyes are prepared under similar conditions, but using the particular quaternary salts described above as represented by Formula XIV and reacting them with the ketomethylene intermediates of Formula XVII.

The merocyanine dyes of our invention are also produced advantageously by reacting the cyclammonium quaternary salt of Formula XII with N,N'-diphenylformamidine, β-anilinoacrolein anil hydrochloride, or glutaconaldehyde dianilide hydrochloride and the refluxing with acetic anhydride to make the 3-acetanilidomethylene, the 3-acetanilidobutadienyl, or the acetanilidohexatrienyl derivative respectively of the salt of Formula XIV which is the condensed with the ketomethylene intermediate having the formula:

XVII. 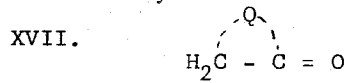

wherein Q is as defined previously. This condensation reaction is advantageously carried out in the presence of any of the basic condensing agents listed previously, in an inert solvent and at temperature between room temperature and the reflux temperature of the solvent in the reaction mixture.

The styryl dyes of our invention which are free from an N,α-alkenylene bridge are advantageously prepared by condensing the quaternary salt of Formula VI with an intermediate used to produce a styryl dye, said intermediate being an aldehyde having the formula:

XVI. 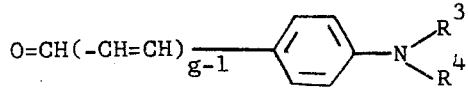

wherein $R^3$, $R^4$ and g are as described previously. This condensation is advantageously effected in the presence of a basic condensing agent, such as a piperidine, or others as described previously, and in the presence of an inert solvent, such as have been described for the merocyanine synthesis. Heat accelerates the reaction which is conveniently carried out between room temperature and the reflux temperature of the solvent.

In addition to the cyanine, merocyanine and styryl dyes whose preparations are described hereinabove, such dyes which include an N,α-alkenylene bridge are advantageously prepared according to the present invention. The polymethine N,α-alkenylene cyanine, merocyanine and styryl dyes are prepared from preformed dyes of this invention having the formulas:

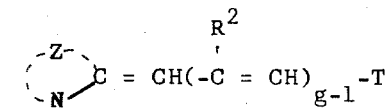

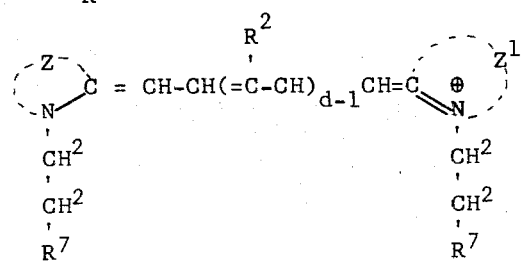

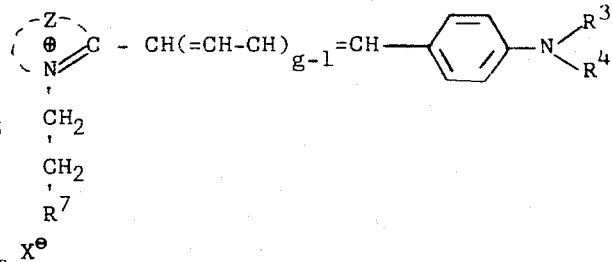

wherein Z, $Z^1$, d, g, $R^2$, $R^3$ and $R^4$, $X^-$ and T are as previously defined and wherein $R^7$ represents either a formyl radical, a dialkoxymethyl radical or a dialkylthiomethyl radical. Preparation is accomplished by heating the preformed, purified dye in an organic solvent medium such as, for example, butyrolactone, acetic acid, dimethylformamide, etc., at a temperature above about 50°C. and below the decomposition temperatures of the reagent or resultant cyclized N,α-alkenylene dye. Adavntageously, reflux conditions can be utilized. The cyclized dye so obtained is typically purified by sequential filtration, drying and washing.

The dyes of this invention are useful in spectrally sensitizing photographic silver halide emulsions when incorporated therein. The dyes are especially useful for extending the spectral sensitivity of the customarily employed silver chloride, silver chlorobromide, silver bromide, silver bromoiodide and silver chlorobromoiodide developing out emulsions using a hydrophilic colloid carrier such as gelatin, its water-soluble derivatives, polyvinyl alcohol, its watersoluble derivatives and copolymers, water-soluble vinyl polymers, such as polyacrylamide, imidized polyacrylamide, etc., and other water-soluble film-forming materials that form water-permeable coatings, such as colloidal albumin, water-soluble cellulose derivatives like ethylanolamine cellulose acetate, etc.

The binding agents for the emulsion layer of a photographic element can also contain dispersed polymerized vinyl compounds. Certain such compounds are disclosed, for example, in U.S. Pat. Nos. 3,142,568 of Nottorf issued July 28, 1964; 3,193,386 of White issued July 6, 1965; 3,062,672 of Houck et al. issued Nov. 6, 1962; and 3,220,844 of Houck et al. issued Nov. 30, 1965; and include the water-insoluble polymers of latex copolymers of alkyl acrylates and methacrylates, acrylic acid sulfoalkyl acrylates or methacrylates and the like. To prepare emulsions sensitized with one or more of the dyes described herein, it is only necessary to disperse the dye or dyes in the emulsions. The methods of incorporating dyes in emulsions are simple and well known to those skilled in the art. In practice, it is convenient to add the dyes to the emulsion in the form of a solution in a suitable solvent. Methanol, ethanol, propanol, etc., acetone and pyridine are used to advantage. The dyes are advantageously incorporated in the finished washed emulsions, and should be uniformly distributed throughout the emulsions.

The concentration of the dyes in theh emulsions can vary widely and will depend upon the type of emulsion and the effect desired. Useful concentrations generally vary between about 25 mg. and 1000 mg. per mole of silver based on the silver halide with from about 50 mg.

to about 400 mg. being preferable. However, more extensive variations can be desirable. The suitable and most economical concentration for any given emulsion will be apparent to those skilled in the art, upon making the ordinary tests and observations customarily used in the art of emulsion making.

To prepare a hydrophilic colloid-silver halide emulsion sensitized with one or more of the dyes of this invention, one can employ the following procedure. A quantity of dye is dissolved in a suitable solvent, such as an alcohol, acetone, pyridine, etc., and a volume of this solution, which may be diluted with water, containing the dye, is slowly added to, for example, a gelatino-silver halide emulsion, with stirring. Stirring is continued until the dye is uniformly dispersed in the emulsion to inhibit undesirable chemical or physical effects.

The above statements are only illustrative, as it will be apparent that the dyes can be incorporated in photographic emulsions by any of the other methods customarily employed in the art, e.g. by bathing a plate or film upon which an emulsion is coated in a solution of the dye in an appropriate solvent. However, bathing methods are ordinarily not to be preferred. Emulsions sensitized with the dyes can be coated on suitable supports to prepare composite photographic elements. Typical supports include cellulose nitrate film, cellulose ester film, poly(vinyl acetal) film, polystyrene film, poly(ethylene terephthalate) film, polycarbonate film and related films or resinous materials, as well as glass, paper, metal and the like. Typically, a flexible support is employed, especially a paper support, which can be partially acetylated or coated with baryta and/or an alpha-olefin polymer, particularly a polymer of an alpha-olefin containing 2 to 10 carbon atoms such as polyethylene, polypropylene, ethylenebutene copolymers and the like.

The emulsions used with this invention can be sensitized with chemical sensitizers, such as with reducing agents; sulfur, selenium or tellurium compounds; gold, platinum or palladium compounds; or combinations of these. Suitable procedures are described in Sheppard U.S. Pat. No. 1,623,499; Allen U.S. Pat. No. 2,399,083; McVeigh U.S. Pat. No. 3,297,447; and Dunn U.S. Pat. No. 3,297,446.

The silver halide emulsions sensitized by the dyes of this invention can also be protected against the production of fog and can be stabilized against loss of sensitivity during keeping. Suitable antifoggants and stabilizers each used alone or in combination include thiazolium salts described in Staud U.S. Pat. No. 2,131,038 and Allen U.S. Pat. No. 2,694,716; and azaindenes described in Piper U.S. Pat. No. 2,886,437 and Heimbach U.S. Pat. No. 2,444,605; the mercury salts as described in Allen U.S. Pat. No. 2,728,663; the urazoles described in Anderson U.S. Pat. No. 3,287,135; the sulfocatechols described in Kennard U.S. Pat. No. 3,236,652; the oximes described in Carroll et al British Patent No. 623,448; nitron; nitroindazoles; the mercaptotetrazoles described in Kendall et al U.S. Pat. No. 2,403,927; Kennard et al. U.S. Pat. No. 3,266,897 and Luckey et al U.S. Pat. No. 3,397,987; the polyvalent metal salts described in Jones U.S. Pat. No. 2,839,405; the thiouronium salts described in Herz U.S. Pat. No. 3,220,839; the palladium, platinum and gold salts described in Trivelli U.S. Pat. No. 3,566,263 and Damschroder U.S. Pat. No. 2,597,915.

As well as including the above-mentioned addenda, the silver halide emulsions employed in this invention can be hardened with any suitable hardener or combinations such as, e.g. formaldehyde, mucochloric acid, glutaraldehyde, maleic dialdehyde, aldehyde hardeners, aziridone hardeners, hardeners which are derivatives of dioxane, vinyl sulfones, oxypolysaccharides such as oxystarch, oxy plant gums, inorganic hardeners, such as chromium salts, and the like. Developing agents of the types suitable for inclusion in a silver halide emulsion are described hereinbelow.

The photographic silver halide emulsions or coatings disclosed herein can also contain non-ionic, anionic and/or amphoteric coating aids. Some useful coating aids include, for example, saponin, alkyl substituted aryloxy alkylene ethyl sulfonates of the type described in U.S. Pat. No. 2,600,831 issued June 17, 1952, maleopimarates of the type described in U.S. Pat. No. 2,832,123, issued Feb. 11, 1958, taurine derivatives of the type described in U.S. Pat. No. 2,739,891 issued on Mar. 27, 1956, and alkyl aminopropionates of the type described in U.S. Pat. No. 3,133,816 issued May 19, 1964. Typical of still other good coating aids and surfactants which can be employed in the emulsions of this invention include the alkylphenoxy poly(hydroxyalkylene oxides) such as alkylphenoxy poly(glycidols) having from about 5 to about 12 glycidol units, for example, such as those disclosed in British Patent No. 1,022,878 issued Mar. 16, 1966, to Olin Mathieson.

To prepare such photographic elements as are described herein, at least one silver halide emulsion of the disclosed type and containing at least one of the dyes of this invention is coated onto a typical photographic support material and dried. Coating can be accomplished by a wide variety of techniques including hopper coating, flow coating, etc. Advantageous support materials include conventional photographic film base materials such as those described elsewhere herein.

Of the dyes described herein, those bearing 1-hydrazonoalkyl substitution are additionally advantageous when used in silver halide internal image emulsions (i.e. those silver halide emulsions which form latent images predominantly inside the silver halide grains and which have a predominant amount of radiation sensitivity in the internal portion of the silver halide grains). More specifically, internal image emulsions include those having silver halide grains wherein a predominant amount of the sensitivity is internal to the grains. Such internal image-forming emulsions are those which, when measured according to normal photographic techniques by coating a test portion of the emulsion on a transparent support, exposing to a light intensity scale having a fixed time between $1 \times 10^6$ and 1 second, bleaching 5 minutes in a 0.3% potassium ferricyanide solution at 65°F. and developing for about 5 minutes at 65°F. in Developer B below (an "internal-type" developer), have a sensitivity, measured at a density of 0.1 above fog, greater than the sensitivity of an identical test portion which has been exposed in the same way and developed for 6 minutes at 68°F, in Developer A below (a "surface-type" developer).

DEVELOPER A

| | |
|---|---|
| N-methyl-p-aminophenol sulfate | 0.31 g. |
| Sodium sulfite, desiccated | 39.6 g. |

-Continued

DEVELOPER A

| | |
|---|---|
| Hydroquinone | 6.0 g. |
| Sodium carbonate, desiccated | 18.7 g. |
| Potassium bromide | 0.86 g. |
| Citric acid | 0.68 g. |
| Potassium metabisulfite | 1.5 g. |
| Water to make 1 liter | |

DEVELOPER B

| | |
|---|---|
| N-methyl-p-aminophenol sulfate | 2.0 g. |
| Sodium sulfite, desiccated | 90.0 g. |
| Hydroquinone | 8.0 g. |
| Sodium carbonate, monohydrate | 52.5 g. |
| Potassium bromide | 5.0 g. |
| Sodium thiosulfate | 10.0 g. |
| Water to make 1 liter. | |

Internal latent image-forming emulsions are typically undigested or if digested, the digestion is carried out without the use of surface chemical sensitizers. An emulsion of this type, known as Burton's emulsion is described in Wall "Photographic Emulsions," 1927, pp. 52 and 53. A further type of suitable reversal emulsion is an internal latent image emulsion described in Davey and Knott, U.S. Pat. No. 2,592,250.

An internal latent image-forming emulsion can be prepared by first forming in one or more stages silver salt grains consisting at least partly of a silver salt which is more soluble in water than silver bromide, subsequently converting at least part of the grains to silver bromide or silver bromoiodide, ripening, preferably in the absence of ammonia, and then either washing out some of the soluble salts or washing out the whole of the soluble salts, followed by the addition of soluble salts such as soluble chloride, bromide, or iodide to prepare a composite silver chlorobromide, bromoiodide or chlorobromoiodide reversal emulsion. Suitable silver chlorobromide internal image emulsions also can be prepared by simultaneously adding an aqueous solution of silver nitrate and an aqueous solution containing potassium chloride and potassium bromide to an agitated aqueous gelatin solution as described in Example 4 of Lucky et al., U.S. Pat. No. 2,996,382.

Still another advantageous method of preparing an internal image emulsion is described in McBride, U.S. Pat. No. 3,271,157 wherein a water-soluble silver salt and a watersoluble halide are reacted to precipitate the silver halide under acidic conditions. The pH of the silver halide precipitation is typically less than 6 and preferably less than 5. Such acids as phosphoric, trifluoracetic, hydrobromic, hydrochloric, sulfur and nitric are typically utilized in the silver halide precipitating media to maintain acidic conditions. An excess of water-soluble halide is more generally used. The pAg during the silver halide precipitation is more generally about 8 to 10. The present silver halide emulsions can be washed after precipitation such as by the methods described in U.S. Pat. Nos. 2,614,929 and 2,618,556. The silver halide grains of the emulsions of the invention generally have an average grain size of about 0.1 to 10 microns, and more generally about 0.5 to 2 microns, in diameter.

Although silver halide emulsions are generally made with an equivalent or slight excess of halide ion present, it is desirable to add additional water-soluble halide, particularly iodide, to the silver halide emulsion after its precipitation but before it is coated. More generally, about 0.1 to 50 mole percent, and preferably about 1 to 10 mole percent of water-soluble halide based on the silver halide in the emulsion are present in these emulsions. Illustrative water-soluble halides include the ammonium, lithium, magnesium, potassium, and sodium salts.

When incorporated into internal image emulsions suitable for reversal processing to prepare a directly developed positive photographic image without an intermediate developed negative image, the 1-hydrazonoalkyl substituted dyes described herein are advantageous as a composite spectral sensitizer - nucleating agent. Conventionally, at least one hydrazonoalkyl dye is added, typically as a solution and with stirring, to a silver halide reversal emulsion of the internal image type mentioned above such as, for example, those described in U.S. Pat. No. 2,566,180 or 2,592,250. The dye is added in an amount designed to produce adequate fog in the form of minute surface development sites, thereby fostering the production of direct positive images upon development. The subject dyes appear to be more tightly adsorbed to the silver halide grain surface than are previously known fogging agents, such as the hydrazine compounds of Ives, U.S. Pat. No. 2,588,982. As such, advantageous nucleation is obtained with the utilization of a diminished amount of fogging agent. As a result, desirable sensitometric characteristics are more easily preserved since less fogging agent is released into develeper solutions.

Generally, concentrations of from about 50 to about 1500 mg. of the subject fogging agents per mole of silver in the silver halide emulsion are useful with from about 200 to about 500 mg. per mole of silver being preferred. These ratios are according to conventional practice, however, and with either particular reversal emulsions, fogging agents of varying chemical activity, or varying processing conditions, more widely varying fogging agent concentrations, e.g., higher concentrations, can be advantageously used. Subsequent to the addition of at least one of the hydrazonoalkyl or acyl substituted dyes described herein, the internal image emulsion can be coated on a support material as described herein to prepare a light-sensitive photographic element capable of producing direct positive images upon imagewise exposure and suitable chemical processing.

The nucleating or fogging hydrazonoalkyl substituted dyes of the invention can be used in reversal color as well as black-and-white silver halide emulsions. The preparation of color reversal photographic elements is conveniently accomplished by employing cyan, magenta and yellow color-forming couplers contiguous to silver halide emulsion layers capable of recording light substantially complementary in color to the color of dye produced with the respective couplers on color development as described in U.S. Pat. Nos. 3,227,550 and 3,227,552. Spectral sensitizing dyes such as the subject dyes or other sensitizers either alone or in combination can be used to sensitize the silver halide in the usual manner. In a multilayer element, the red-recording emulsion layer can contain a coupler such as 5-(p-amylphenoxy benzene sulfonamino)-1-naphthol, the green-recording emulsion layer, a coupler like 2-cyanoacetyl-5-(p-sec.amylbenzoylamino) coumarone and the blue-recording emulsion layer, a coupler such as N-amyl-p-benzoylacetamino benzene sulfonate. Additional couplers are well known in the art. If desired, the color couplers can be incorporated into the developer solution, as described in Mannes et al., U.S. Pat.

No. 2,252,718 and Glass et al. U.S. Pat. No. 2,507,154, such an arrangement necessitating multiple exposures and color developing steps.

After an imagewise exposure, the direct positive photographic elements containing the subject nucleating dyes are immersed in a conventional surface developer solution having relatively low solvent action on silver halide whereupon a positive, black-and-white, photographic silver image is formed. Such surface developers can advantageously contain image-enhancing compounds which increase maximum image density and lower minimum image density such as the benzotriazoles described in Stauffer, U.S. Pat. No. 2,497,917.

If color images are to be prepared, the developer solution typically contains a p-phenylenediamine color developing agent such as a 4-amino-N-dialkylaniline like those described in Mees, "The Theory of the Photographic Process," 3rd Ed. (1966) pp. 294–295. With a color developer, one or more colored dye images are produced depending upon the construction of the particular photographic element. In polychromatic color elements, cyan, magenta and yellow dye images are typically produced in the red sensitive, green sensitive and blue sensitive layers, respectively. Remaining silver is first converted to a soluble silver salt and removed in the usual way by treatment with a fixing agent such as sodium thiosulfate.

In addition to their advantageous use as nucleating agents in direct positive elements, the hydrazonoalkyl substituted dyes described herein are desirable as halogen acceptors in internal image emulsions which are useful as light-developable, direct-print photographic emulsions. Generally, these internal image emulsions are similar to those described above in conjunction with the direct positive processing sequence. They are distinguished, however, as regards the process for preparing these internal image emulsions since the photographic requirements of direct positive and direct print uses demand different photographic and chemical capabilities from specific emulsion formulations. Direct positive elements are chemically developed with a processing bath to produce an image. The developing-out type of photographic element, as the name implies, requires that the exposed material be chemically developed and fixed in order to provide a stable visible image. The print-out type of photographic element develops on exposure and requires no solution development step. The print-out type is generally much slower than the developing-out type, and the images tend to be less stable.

Especially useful internal image silver halide emulsions for direct print include those described in McBride, U.S. Pat. No. 3,271,157, which are prepared in the presence of lead ions. Lead ions can be used in the precipitation or formation of the silver halide used in the emulsions useful herein. Water-soluble lead salts are typically added with a water-soluble silver salt to an appropriate water-soluble halide to precipitate a lead-silver halide. The amount of lead used in the described silver halide internal image emulsions generally ranges from about 0.01 to 5 mole percent based on the silver. The use of such lead ions in the formation of the silver halide facilitates the reduction of background density ($D_{min.}$) while exhibiting increased image density ($D_{max.}$) when exposed to a high intensity light source and photodeveloped by exposure to a lower intensity light source.

Additionally, direct-print silver halide emulsions desirably contain silver halide grains grown or formed in the presence of an organic thioether silver halide solvent, typically in solution form. Aqueous solutions of suitable organic thioether silver halide solvents utilized during the grain growth or formation of the silver halide grains have a greater solubility for silver chloride than water. More specifically, such thioether silver halide solvents are those which, when utilized in aqueous solutions at 0.02 molar concentrations and at 60°C, are capable of dissolving more than twice the amount (by weight) of silver chloride than that which can be dissolved by water at 60°C.

The thioether silver halide solvent can be added to the silver halide emulsion at any stage of the preparation thereof before the silver halide grains have attained their ultimate size and shape, for example by being added to the colloidal material in which the silver halide is precipitated by being added in combination with one of the water-soluble salts utilized to form the silver halide, such as with the water-soluble silver salt (e.g., silver nitrate) or with a water-soluble halide such as an alkali metal halide, by being added to the silver halide prior to or during the ripening of the silver halide, or by being added during one or more of such emulsion preparation steps. The amount of thioether silver halide solvent utilized can be widely varied depending on the effect desired, the nature of the thioether utilized and related variables.

Typical organic thioether silver halide solvents that can be suitably utilized contain at least one moiety wherein oxygen and sulfur atoms are separated by an ethylene radical (e.g., —O—$CH_2CH_2$—S—). Generally, the silver halide solvents have 1 to 3 thioether atoms (—S—) although silver halide solvents having more than 3 thioether atoms can be utilized. Preferred thioether silver halide solvents are described in detail in McBride, U.S. Pat. No. 3,271,157, especially from column 2, line 36, to column 3, line 26.

The concentrations of the subject hydrazonoalkyl substituted dyes employed as halogen acceptors in direct print elements are typically widely variable in accordance with usual practice. Generally, from about .1 to 100 mole percent, and preferably from about 1 to 50 mole persent, based on the silver halide in the emulsion, is used.

Photodevelopable photographic silver halide emulsions of the type described herein can contain other halogen acceptors as well as the addenda generally utilized in such products including spectral sensitizing dyes, hardeners, plasticizers, coating aids, and the like. Coating the composite emulsion onto a support such as those described herein is conveniently accomplished by usual methods such as those previously mentioned.

The formation of a light-developed image with a typical photographic element containing a direct-print emulsion as described herein can be accomplished by the following procedure.

The photographic element is initially exposed to a relatively short duration and high intensity source of electromagnetic radiation (e.g., at least about .1 footcandle second at an intensity light source of the type used in oscillographs described in Heiland, U.S. Pat. No. 2,580,427, issued Jan. 1, 1952. The light source can emit various types of radiation, e.g., high intensity visible light, X-radiation and the like, to form a latent image in the emulsion of the photographic element.

Typical suitable high-intensity light sources are mercury vapor lamps that have high blue and ultraviolet emission, xenon lamps that emit light of wavelengths similar to daylight, and tungsten lamps that have high red light emission. After a high intensity exposure, the resulting latent image is photodeveloped by overall exposure of the emulsion to a radiation source (e.g., at least about 0.0001 foot-candle second) of lower intensity than the original exposure, such as to a conventional fluorescent light, light from incandescent lamps commonly used for general illumination, or even ordinary daylight. Generally, the latent image formed in the emulsion in the first instance is not visible and does not become visible until photodevelopment. Heat is desirably utilized during the photodevelopment step. Typically the emulsions are heated to a temperature of about 90°C. to 200°C. for about 1 to 30 seconds and photodeveloped after the initial high intensity exposure.

If desired, photographic elements containing the described direct-print emulsions can be developed and fixed in aqueous chemical developing-out and fixing solutions after the initial exposure forming the latent image, or after the above-described photodevelopment, to make archival-quality records. Developing agents can be incorporated in the emulsions of the invention including such developing agents as hydroquinones, catechols, aminophenols, 3-pyrazolidones and the like.

The following illustrative examples are included for a further understanding of the invention:

EXAMPLE 1

Preparation of 3-ethyl-3'-(2-formylethyl)oxathiacarbocyanine iodide 3-(2-Formylethyl-2-methylbenzothiazolium bromide (1 mol., 2.86 g.) and 2-β-acetanilidovinyl-3-ethylbenzothiazolium iodide (1 mol., 4.3 g.) are mixed in methyl alcohol (25 mol.), triethylamine (1 mol., 1.4 ml.) is added and the entire mixture is stirred at room temperature (20°C) for 30 minutes. The reaction mixture is then chilled and a crystalline dye is collected on a filter funnel, washed with acetone and dried. After two recrystallizations from methyl alcohol, the yield of pure dye is 2.1 g. (42%), m.p. 209°–210°C.

EXAMPLE 2

Preparation of 3-ethyl-3'-(2-formylethyl)-thiacarbocyanine iodide 3-(2-Formylethyl)-2-methylbenzothiazolium bromide (1 mol., 2.86 g.) and 2-β-acetanilido-vinylbenzothiazolium iodide (1 mol., 4.5 g.) are mixed in methyl alcohol (25 mol.), triethylamine (1 mol., 1.4 ml.) is added and the entire mixture is stirred at room temperature (20°C) for 20 minutes. The reaction mixture is then chilled, and a crystalline dye is collected on a filter funnel, washed with acetone and dried. After two recrystallizations from cresol and methyl alcohol, the yield of pure dye is 2.5 g. (48%), m.p. 249-250°C dec.

EXAMPLE 3

Preparation of 3-ethyl-3',10-(1,3-prop-2-enylene)oxathiacarbocyanine iodide:

3-Ethyl-3'-(2-formylethyl)oxathiacarbocyanine iodide (1 mol., 2.7 g.) is mixed in acetic acid (40 ml.) and the mixture is heated under reflux for 5 minutes, after which the mixture is chilled and the crystalline dye is collected on a filter funnel, washed with acetone and dried. After five recrystallizations from acetic acid, the yield of pure dye is 0.2 g. (8%), m.p. 208°–209°C dec.

EXAMPLE 4

Preparation of 3-ethyl-3',10-(1,3-prop-2-enylene)thiacarbocyanine iodide

3-Ethyl-3'-(2-formylethyl)thiacarbocyanine iodide (1 mol., 4.5 g.) is mixed in dimethylacetamide (10 ml.) in a large test tube, and the mixture is heated over a free flame with hand stirring for 30 seconds. At this point, the starting dye dissolves and the cyclized dye starts to crystallize from solution. The reaction mixture is then cooled, and the crystalline dye is collected on a filter funnel, washed with acetone and dried. After two recrystallizations from cresol and methyl alcohol, the yield of pure dye is 0.7 g. (16%), m.p. 228°–229°C dec.

EXAMPLE 5

Preparation of 3'-ethyl-3,8-(1,3-prop-2-enylene)-5',6'-benzothiacarbocyanine iodide 3-Ethyl-3'-(2-formylethyl)-5,6-benzothiacarbocyanine iodide (1 mol., 1 g.) is mixed in γ-butyrolactone (50 ml.) and acetic acid (100 ml.) and the mixture is heated at 85°C for 5 minutes. The reaction mixture is chilled overnight after which crystalline dye is collected on a filter funnel, washed with acetone and dried. After two recrystallizations from cresol and methyl alcohol, the yield of pure dye is 0.2 g. (20%), m.p. 214°–215°C dec.

EXAMPLE 6

Preparation of 3,3'-di-(3,3-diethoxypropyl)thiacarbocyanine iodide 3-(3,3-Diethoxypropyl)-2-methylbenzothiazolium iodide (2 mols., 4.07 g.) and diethoxymethylacetate (1 mol. + 100% excess, 1.62 g.) are mixed in refluxing dimethylacetamide (35 ml.) and the mixture is stirred while heating on a hot plate for one minute. The mixture is then chilled, after which crystalline dye is collected on a filter funnel, washed with acetone and dried. After two recrystallizations from ethanol, the yield of pure dye is 1.4 g. (40%), m.p. 177°–178°C dec.

EXAMPLE 7

Preparation of 3,3'-bis-(3,3-diethoxypropyl)thiadicarbocyanine perchlorate 3-(3,3-Diethoxypropyl)-2-methylbenzothiazolium iodide (2 mols., 4.07 g.) and trimethoxypropene (1 mol. + 100% excess, 1.62 g.) are mixed in refluxing dimethylacetamide (35 ml.) and the mixture is heated with stirring on a hot plate for two minutes. The mixture is then chilled, whereupon the dye is precipitated as a mobile mass by adding an excess of diethyl ether. The ether is then decanted, more ether is added with stirring, the ether is again decanted, and the sticky dye residue is dissolved in methyl alcohol (100 ml.). The dye is then converted to the perchlorate salt by adding aqueous sodium perchlorate solution to the methyl alcohol dye solution with stirring. The solid dye is col-

EXAMPLE 8

Preparation of
3-ethyl-3'-(3,3-diethoxypropyl)-5,6-benzothiacarbocyanine iodide 3-(3,3-Diethoxypropyl)-2-methylbenzothiazolium iodide (1 mol., 4.07 g.) and 2-β-acetanilidovinyl-3-ethylnaphtho[2,3-d]thiazolium iodide (1 mol., 5 g.) are mixed in absolute ethyl alcohol (40 ml.), triethylamine (2 mols., 2.8 ml.) is added and the entire mixture is stirred vigorously at room temperature (20°C) for one half-hour. The mixture is then chilled after which a crystalline dye is collected on a filter funnel, washed with acetone and dried. After two recrystallizations from methyl alcohol, the yield of pure dye is 2.5 g. (38%), m.p. 199°–200°C.

EXAMPLE 9

Preparation of
3-(3,3-diethoxypropyl)-2-p-dimethylaminostyrylbenzothiazolium iodide 3-(3,3-Diethoxypropyl)-2-methylbenzothiazolium iodide (1 mol., 4.07 g.) and p-dimethylaminobenzaldehyde (1 mol., + 100% excess, 2.99 g.) are mixed in absolute ethyl alcohol (25 ml.), 2 drops piperidine are added, and the entire mixture is heated under reflux for one hal-hour. The mixture is then chilled, and a crystalline dye is collected on a filter funnel, washed with acetone and dried. After four recrystallizations from ethyl alcohol, the yield of pure dye is 1.4 g. (26%), m.p. 161°–162°C dec.

EXAMPLE 10

Preparation of
5-{[3-(3,3-diethoxypropyl)-2-benzothiazolinylidene]ethylidene}-3-ethylrhodanine:

3-(3,3-Diethoxypropyl)-2-methylbenzothiazolium iodide (1 mol., 4.07 g.) and 5-acetanilidomethylene rhodanine (1 mol., 3.06 g.) are mixed in dry pyridine (40 ml.), triethylamine (1 mol., 1.4 ml.) is added and the mixture is heated under reflux for two minutes. The mixture is then chilled and the dye is precipitated as a dull red solid by adding an excess of water with stirring. The dye is collected on a filter funnel, washed with an excess of water and dried. After two recrystallizations from absolute ethanol, the yield of pure dye is 3.2 g. (71%), m.p. 153°–154°C dec.

EXAMPLE 11

Preparation of
3,3'-Bis-(2-acetylethyl)thiacarbocyanine bromide 3-(2-Acetylethyl)-2-methylbenzothiazolium bromide (2 mols., 3 g.) and diethoxymethylacetate (1 mol., + 100% excess, 1.6 g.) are mixed in refluxing dimethylacetamide (20 ml.) and the mixture is heated under reflux for 1 minute. The mixture is then chilled and the crystalline dye is collected on a filter funnel, washed with acetone and dried. After two recrystallizations from methyl alcohol, the yield of pure dye is 0.6 g. (23%), m.p. 187°–188°C dec.

EXAMPLE 12

Preparation of
3,3'-Bis-(2-acetylethyl)-thiadicarbocyanine bromide 3-(2-Acetylethyl)-2-methylbenzothiazolium bormide (2 mols., 3 g.) and 1,3,3-trimethoxypropene (1 mol. + 100% excess, 1.6 g.) are mixed in refluxing dimethylacetamide (20 ml.) and the mixture is heated under reflux for 1 minute. The mixture is then chilled and crystalline dye is collected on a filter funnel, washed with acetone and dried. After two recrystallizations from methanol, the yield of pure dye is 0.65 g. (29%), m.p. 182°–183°C dec.

EXAMPLE 13

Preparation of
3-(2-acetylethyl)-2-p-dimethylaminostyrylbenzothiazolium iodide 3-(2-Acetylethyl)-2-methylbenzothiazolium bromide (1 mol., 1.5 g.) and p-dimethylaminobenzaldehyde (1 mol. + 100% excess, 1.5 g.) are mixed in absolute ethyl alcohol (15 ml.), piperidine (2 drops) is added and the mixture is heated under relux for 1 hour. The mixture is then treated with sodium iodide (0.5 g.), chilled, and crystalline dye is collected on a filter funnel, sequentially washed with water and acetone, then dried. After two recrystallizations from methyl alcohol, the yield of pure dye is 0.4 g. (17%), m.p. 192°–193°C dec.

EXAMPLE 14

Preparation of
5{[3-(2-acetylethyl)-2-benzothiazolinylidene]ethylidene}-3-ethylrhodanine:

3-(2-Acetylethyl)-2-methylbenzothiazolium bromide (1 mol., 1.5 g) and 5-acetanilidomethylene-3-ethylrhodanine (1 mol., 1.53 g.) are mixed in dry pyridine (15 ml.), triethylamine (2 mols., 1.4 ml.) is added and the mixture is heated under reflux for 1 minute. The mixture is then chilled and the dye precipitated from solution by adding an excess of methyl alcohol with stirring. The solid dye is then collected on a filter funnel, washed with methyl alcohol and dried. After two recrystallizations from a mixture of 2 parts methyl alcohol and 1 part pyridine, the yield of pure dye is 0.3 g. (15%), m.p. 206°–207°C dec.

EXAMPLE 15

Preparation of
3,3'-Bis-(2-acetylethyl)selenacarbocyanine bormide 3-(2-Acetylethyl)-2-methylbenzoselenazolium bromide (1 mol., 0.87 g.) and diethoxymethylacetate (1 mol. + 100% excess, 0.82 g.) are mixed in acetonitrile (10 ml.) and the mixture is heated under reflux for 3 minutes. The mixture is then chilled and the crystalline dye collected on a filter funnel, washed with acetone and dried. After two recrystallizations from methyl alcohol, the yield of pure dye is 0.2 g. (13%), m.p. 190°–191°C. dec.

EXAMPLE 16

Preparation of 3-(2-acetylethyl)-3'-ethylselenathiacyanine iodide 3-(2-Acetyl)-2-methylbenzoselenazolium bromide (1 mol., 0.87 g.) and 3-ethyl-2-ethylmercaptobenzothiazolium ethosulfate (1 mol., 0.87 g.) are mixed in absolute ethyl alcohol (15 ml.), triethylamine (2 mols., 0.7 ml.) is added and the mixture is heated under reflux for 3 minutes. The mixture is then treated with sodium iodide (0.5 g.) and chilled, after which a solid dye collected on a filter funnel, washed with water, then with acetone and dried. After two recrystallizations from methyl alcohol, the yield of pure dye is 0.3 g. (22%), m.p. 246°–247°C dec.

EXAMPLE 17

Preparation of 3,3'-Bis-(2-acetylethyl)selenadicarbocyanine bromide 3-(2-Acetylethyl)-2-methylbenzoselenazolium bromide (2 mols., .87 g.) and 1,3,3-trimethoxypropene (1 mol. + 100% excess, 0.66 g.) are mixed in acetonitrile (15 ml.) and the mixture is heated under reflux for 3 minutes. The mixture is then chilled, and a crystalline dye is collected on a filter funnel, washed with acetone and dried. After two recrystallizations from methyl alcohol, the yield of pure dye is 0.6 g. (38%), m.p. 199°–200°C dec.

EXAMPLE 18

Preparation of 3-(2-acetylethyl)-3'-ethyloxaselenacarbocyanine iodide 3-(2-Acetylethyl)-2-methylbenzoselenazolium bromide (1 mol., 0.87 g.) and 2-β-acetanilidovinyl-3-ethylbenzoxazolium iodide (1 mol., 1.08 g.) are mixed in ethyl alcohol (10 mol.). Triethylamine (2 mols., 0.7 ml.) is added, and the entire mixture is heated under reflux for 2 minutes. The mixture is then chilled, and a crystalline dye is collected on a filter funnel, washed with acetone and dried. After two recrystallizations from methyl alcohol, the yield of pure dye is 0.6 g. (43%), m.p. 211°–212°C.

EXAMPLE 19

Preparation of 3-(2-acetylethyl)-3'-ethyl-9-methylselenathiacarbocyanine bromide 3-(2-Acetylethyl)-2-methylbenzoselenazolium bromide (1 mol., 0.87 g.) and 3-ethyl-2-(2-ethylmercaptopropenyl)benzothiazolium ethosulfate are mixed in absolute ethyl alcohol (10 ml.). Triethylamine (2 mols., 0.7 ml.) is added and the mixture is heated under reflux for 2 minutes. The mixture is then chilled, and a crystalline dye is collected on a filter funnel, washed with acetone and dried. After recrystallizations from methyl alcohol, the yield of pure dye is 0.3 g. (22%), m.p. 226°–227°C dec.

EXAMPLE 20

Preparation of 3-(2-acetylethyl)-2-p-dimethylaminostyrylbenzoselenazolium iodide 3-(2-Acetylethyl)-2-methylbenzoselenazolium bromide (1 mol., 0.87 g.) and p-dimethylaminobenzaldehyde (1 mol. + 100% excess, 0.75 g.) are mixed in ethyl alcohol (10 ml.), piperidine (2 drops) is added and the mixture is heated under reflux for 1 hour. The mixture is then chilled, and a crystalline dye is collected on a filter funnel, washed with acetone and dried. After two recrystallizations from methyl alcohol, the yield of pure dye is 0.6 g. (50%), m.p. 206°–207°C. dec.

EXAMPLE 21

Preparation of 5{[3-(2-Acetylethyl)-2-benzoselenazolinylidene]ethylidene}-3-ethylrhodanine 3-(2-Acetylethyl)-2-methylbenzoselenazolium bromide (1 mol., 0.87 g.) and 5-acetanilidomethylene-3-ethylrhodanine (1 mol., 0.76 g.) are mixed in absolute ethyl alcohol (10 ml.), triethylamine (2 mols., 0.7 ml.) is added and the mixture is heated under reflux for five minutes. The mixture is then chilled, and a crystalline dye is collected on a filter funnel, washed with methyl alcohol and dried. After two recrystallizations from pyridine, the yield of pure dye is 0.3 g. (28%), m.p. 214°–215°C dec.

EXAMPLE 22

Preparation of 3-ethyl-3'-(3-thiosemicarbazonopropyl)-thiacyanine bromide

2-Methyl-3-(3-thiosemicarbazonopropyl)benzothiazolium bromide (1 mol., 1.19 g.) and 3-ethylmercaptobenzothiazolium ethylsulfate (1 mol., 1.16 g.) are dissolved in dry pyridine (10 ml.), triethylamine (4 mol., 1.9 ml.) is added, and the mixture is heated under reflux for 2 minutes. The mixture is then chilled, and a crystalline dye is collected on a filter funnel, washed well with acetone and dried. After two recrystallizations from methyl alcohol, the yield of pure dye is 0.4 g. (23%), m.p. 168°–169°C dec.

EXAMPLE 23

Preparation of 1'-ethyl-3-(3-thiosemicarbazonopropyl)-thia-2'-cyanine bromide

2-Methyl-3-(3-thiosemicarbazonopropyl)benzothiazolium bromide (1 mol., 1.19 g.) and 1-ethyl-2-phenylmercaptoquinolinium-p-toluenesulfonate (1 mol., 1.44 g.) are dissolved in dry pyridine (10 mol.), triethylamine (4 mols., 1.9 ml.) is added and the mixture is heated under reflux for 2 minutes. The mixture is then chilled, and crystalline dye is collected on a filter funnel, washed with acetone and dried. After two recrystallizations from methyl alcohol, the yield of pure dye is 0.25 g. (14%), m.p. 186°–187°C dec.

EXAMPLE 24

Preparation of 3-ethyl-3'-(3-thiosemicarbazonopropyl)thiacarbocyanine iodide

3-Methyl-3-(3-thiosemicarbazonopropyl)benzothiazolium bromide (1 mol., 1.79 g.) and 2-β-acetanilidovinyl-3-ethylbenzothiazolium iodide (11 mol., 2.25 g.) are mixed in absolute ethyl alcohol (100 ml.), triethylamine (4 mols., 2.8 ml.) is added and the mixture is heated under reflux for 3 minutes. The mixture is then chilled, and the crystalline dye is collected on a filter funnel, washed with acetone and dried. After two recrystallizations from methyl alcohol, the yield of pure dye is 1.5 g. (50%), m.p. 180°–181°C dec.

EXAMPLE 25

Preparation of 3-ethyl-3'-(3-thiosemicarbazonopropyl)oxathiacarbocyanine iodide

2-Methyl-3-(3-thiosemicarbazonopropyl)benzothiazolium bromide (1 mol., 1.79 g.) and 2-β-acetanilidovinyl-3-ethylbenzoxazolium iodide (1 mol., 2.16 g.) are mixed in absolute ethyl alcohol (100 ml.), triethylamine (4 mols., 8 ml.) is added and the mixture is heated under reflux for 3 minutes. The mixture is then chilled, and a crystalline dye is collected on a filter funnel, washed with acetone and dried. After 2 recrystallizations from methyl alcohol, the yield of pure dye is 1.5 g. (52%), m.p. 160°–161°C.

EXAMPLE 26

Preparation of 3-ethyl-9-methyl-3'-(3-thiosemicarbazonopropyl)-thiacarbocyanine bromide 2-Methyl-3-(3-thiosemicarbazolopropyl)benzothiazolium bromide (1 mol., 1.79 g.) and 3-ethyl-2-(2-ethylmercapto-1-propenyl)benzothiazolium ethylsulfate (1 mol., 1.95 g.) are mixed in absolute ethyl alcohol (100 ml.), triethylamine (4 mols., 2.8 ml.) is added, and the entire mixture is heated under reflux for 5 minutes. The mixture is then chilled, and a crystalline dye is collected on a filter funnel, washed with acetone and dried. After two recrystallizations from methyl alcohol, the yield of pure dye is 1 g. (36%), m.p. 159°–160°C dec.

EXAMPLE 27

Preparation of 2-p-dimethylaminostyryl-3-(3-thiosemicarbazonopropyl)benzothiazolium bromide 2-Methyl-3-(3-thiosemicarbazolopropyl)benzothiazolium bromide (1 mol., 1.79 g.) and p-dimethylaminobenzaldehyde (1 mol. + 100% excess, 1.49 g.) are mixed in acetic anhydride (20 ml.) and the mixture is heated under reflux for 3 minutes. The mixture is then chilled and a crystalline dye is collected on a filter funnel, washed with acetone and dried. After two recrystallizations from methyl alcohol, the yield of pure dye is 0.2 g. (8%), m.p. 211°–212°C dec.

EXAMPLE 28

Preparation of 3-ethyl-5-{[3-(3-thiosemicarbazonopropyl)-2-benzothiazolinylidene]ethylidene}-rhodanine 2-Methyl-3-(3-thiosemicarbazonopropyl)benzothiazolium bromide (1 mol., 1.79 g.) and 5-acetanilidomethylene-3-ethylrhodanine (1 mol., 1.53 g.) are mixed in dry pyridine (10 ml.), triethylamine (4 mols., 2.8 ml.) is added, and the mixture is heated under reflux for 3 minutes. The mixture is then chilled, and a crystalline dye is collected on a filter funnel, washed with methyl alcohol and dried. After two recrystallizations from pyridine, the yield of pure dye is 0.25 g. (11%) m.p. 230°–231°C dec.

EXAMPLE 29

Preparation of 3,3'-Bis-(3-phenylhydrazonopropyl)-thiacarbocyanine bromide

2-Methyl-3-(3-phenylhydrazonopropyl)benzothiazolium bromide (2 mols., 3.76 g.) and diethoxymethylacetate (1 mol. + 100% excess, 3.2 g.) are mixed in acetonitrile (20 ml.) in a large test tube, triethylamine (3 mols., 2.1 ml.) is added and the mixture is heated over a free flame to reflux temperature. Pyridine (1.5 ml.) is then added, and this mixture is again heated to reflux. Thereafter, the mixture is chilled and allowed to stand at room temperature (20°C) overnight, after which a crystalline dye is collected on a filter funnel, washed with acetone and dried. After two recrystallizations, from a 10 to 1 acetonitrilepyridine solution, the yield of pure dye is 0.5 g. (15%), m.p. 148°–149°C dec.

EXAMPLE 30

Preparation of 3,3'-Bis-(3-phenylhydrazonopropyl)-thiacarbocyanine bromide

2-Methyl-3-(3-hydrazonopropyl)benzothiazolium bromide (2 mols., 3.76 g.) and 1,3,3-trimethoxypropene (1 mol. + 100% excess, 2.6 g.) are mixed in a solution of benzonitrile (15 ml.) and pyridine (2 ml.), triethylamine (3 mols., 2.1 ml.) is added and the mixture is heated to reflux temperature. The mixture is then chilled and a crystalline dye is collected on a filter funnel, washed with acetone and dried. After two recrystallizations from a 2 to 1 solution of acetonitrile and pyridine, the yield of pure dye is 0.2 g. (6%), m.p. 163°–164°C dec.

EXAMPLE 31

Preparation of 3-ethyl-3'-(3-phenylhydrazonopropyl) oxathiacarbocyanine iodide

2-Methyl-3-(3-phenylhydrazonopropyl)benzothiazolium bromide (1 mol., 1.88 g.) and 2-β-acetanilidovinyl)-3-ethylbenzoxazolium iodide (1 mol., 2.17 g.) are placed in a large test tube and mixed in absolute ethyl alcohol (20 ml.). Triethylamine (2 mols., 1.4 ml.) is added and the mixture is heated under reflux for 2 minutes. The mixture is then chilled, and a crystalline dye is collected on a filter funnel, washed with acetone and dried. After three recrystallizations from methanol, the yield of pure dye is 1.1 g. (37%), m.p. 151°–152°C dec.

EXAMPLE 32

Preparation of 3-ethyl-9-methyl-3'-(3-phenylhydrazonopropyl)-thiacarbocyanine

2-Methyl-3-(3-phenylhydrazonopropyl)benzothiazolium bromide (1 mol., 1.88 g.) and 3-ethyl-3-(2-ethylmercaptopropenyl)benzothiazolium ethylsulfate (1 mol., 1.94 g.) are mixed in absolute ethyl alcohol (20 ml.), triethylamine (2 mols., 1.4 ml.) is added and the mixture is heated under reflux for 3 minutes. The mixture is then chilled and a crystalline dye is collected on a filter funnel, washed with acetone and dried. After two recrystallizations from methyl alcohol, the yield of pure dye is 1.1 g. (37%), m.p. 140°–141°C dec.

EXAMPLE 33
Preparation of
2-p-dimethylaminostyryl-3-(3-phenylhydrazono)benzothiazolium bromide 2-Methyl-3-(3-phenylhydrazono)benzothiazolium bromide (1 mol., 1.88 g.) and p-dimethylaminobenzaldehyde (1 mol. + 100% excess, 1.5 g.) are mixed in absolute ethyl alcohol (15 ml.), piperidine (3 drops) is added and the mixture is heated under reflux for 5 minutes. The mixture is then chilled and a crystalline dye is collected on a filter funnel, washed with acetone and dried. After two recrystallizations from methyl alcohol, the yield of pure dye is 0.3 g. (12%), m.p. 178°–179°C dec.

EXAMPLE 34
Preparation of
3-Ethyl-5-[3-(3-phenylhydrazonopropyl)benzothiazolinylidene]ethylidene rhodanine 2-Methyl-3-(3-phenylhydrazonopropyl)benzothiazolium bromide (1 mol., 1.88 g.) and 5-acetanilidomethylene-3-ethylrhodanine (1 mol., 1.5 g.) are mixed in absolute ethyl alcohol (20 ml.), triethylamine (2 mols., 1.4 ml.) is added and the mixture is heated under reflux for 3 minutes. The mixture is then chilled, and a crystalline dye is collected on a filter funnel, washed with methyl alcohol and dried. After two recrystallizations from pyridine, the yield of pure dye is 0.2 g. (5%) m.p. 187°–188°C. dec.

EXAMPLE 35
Preparation of
Anhydro-3,3'-bis-(3-hydroxy-3-sulfopropyl)thiacarbocyanine hydroxide monosodium salt Anhydro-3-(3-hydroxy-3-sulfopropyl)benzothiazolium hydroxide (2 mols., 2.88 g.) and diethoxymethylacetate (1 mol. + 100% excess, 1.6 g.) are mixed in dry pyridine (20 ml.) and the mixture is heated under relux for 1 minute. The mixture is then chilled and the crystalline dye is collected on a filter funnel, washed with acetone and dried. After two recrystallizations from a solution of pyridine and water (8:2), the yield of pure dye is 0.3 g. (10%), m.p. 261°–262°C. dec.

EXAMPLE 36
Preparation of
Anhydro-3-ethyl-3'-(3-hydroxy-3-sulfopropyl)thiacyanine hydroxide:

Anhydro-3-(3-hydroxy-3-sulfopropyl)benzothiazolium hydroxide (1 mol., 1.44 g.) and 3-ethyl-2-ethylmercaptobenzothiazolium ethosulfate (1 mol., 0.87 g.) are mixed in ethyl alcohol (10 ml.), triethylmaine (2 mols., 1.4 ml.) is added and the mixture heated under reflux 2 minutes. The yellow dye crystallizes from the hot solution. The reaction mixture is chilled and the crystalline dye is collected on a filter funnel, washed with acetone and dried. After two recrystallizations from aqueous pyridine, the yield of pure dye is 0.5 g. (22%), m.p. 198°–199°C. dec.

EXAMPLE 37
Preparation of
Anhydro-3-ethyl-3'-(3-hydroxy-3-sulfopropyl)oxathiacarbocyanine hydroxide:

Anhydro-3-(3-hydroxy-3-sulfopropyl)benzothiazolium hydroxide (1 mol., 0.72 g.) and 2-$\beta$-acetanilidovinyl-3-ethylbenzoxazolium iodide (1 mol., 1.08 g.) are mixed in ethyl alcohol and the mixture is heated to reflux; triethylamine (2 mols., 0.7 ml.) is added and the mixture is heated to reflux again at which time the dye crystallizes from solution. The reaction mixture is chilled and the crystalline dye is collected on a filter funnel, washed with acetone and dried. After two recrystallizations from a solution of pyridine and water (10:1), the yield of pure dye is 0.2 g. (17%), m.p. 177°–178°C. dec.

EXAMPLE 38

A sensitizing amount of each of the dyes from preceding Examples 1 to 11; 13 to 28; and 30 and 32 to 37 is added to a separate portion of gelatino-silver halide emulsion. Each of these emulsion portions is coated on a cellulose ester support and dried to prepare photographic elements. Spectrographic exposure are made on each element and these are processed for 3 minutes at 20°C. in a photographic developer having the formula:

| | |
|---|---|
| p-Methylaminophenol sulfate | 2.0 grams |
| Sodium sulfite, desiccated | 90.0 grams |
| Hydroquinone | 8.0 grams |
| Sodium carbonate. $H_2O$ | 32.5 grams |
| Potassium bromide | 5.0 grams |
| Water to make | 1 liter | fixed in a conventional sodium thiosulfate fixing bath, washed and dried. The following table summarizes the wavelength of light to which the maximum sensitivity is produced and the range of wavelength light to which each element is sensitized.

| Example Number | Emulsion | Dye Conc. (mg./mole Ag) | Sensitization Maximum (nm) | Range (nm) |
|---|---|---|---|---|
| 1 | ClBr | 140 | 545 | 640 |
|   | BrI  | 50  | 550 | 610 |
| 2 | ClBr | 140 | 585 | 660 |
|   | BrI  | 50  | 585 | 660 |
| 3 | ClBr | 140 | 585 | 660 |
|   | BrI  | 90  | 580 | 630 |
| 4 | ClBr | 140 | 620 | 670 |
|   | BrI  | 90  | 620 | 660 |
| 5 | BrI  | 40  | 615 | 630 |
| 6 | ClBr | 170 | 590 | 635 |
|   | BrI  | 50  | 590 | 635 |
| 7 | BrI  | 60  | 700 | 640–730 |
| 8 | ClBr | 130 | 600 | 640 |
|   | BrI  | 40  | 600 | 640 |

—Continued

| Example Number | Emulsion | Dye Conc. (mg./mole Ag) | Sensitization Maximum (nm) | Range (nm) | |
|---|---|---|---|---|---|
| 9 | ClBr | 170 | 520 | 590 | |
|  | BrI | 110 | 530 | 635 | (broad) |
| 10 | ClBr | 100 | 520,580 | 645 | |
|  | BrI | 140 | 580 | 640 | |
| 11 | ClBr | 130 | fog | | |
|  | BrI | 40 | 590 | 640 | |
| 12 | ClBr | 70 | fog | | |
|  | BrI | 20 | fog | | |
| 13 | ClBr | 150 | 510 | 655 | |
|  | BrI | 90 | 520 | 655 | |
| 14 | ClBr | 70 | 530,580 | 640 | |
|  | BrI | 80 | 580 | 640 | |
| 15 | ClBr | 90 | fog | | |
|  | BrI | 90 | 615 | 640 | (fog .80) |
| 16 | ClBr | 140 | 460 | 495 | |
| 17 | ClBr | 70 | 570 | 650 | |
| 18 | ClBr | 140 | no def.max. | 630 | |
|  | BrI | 90 | 550 | 640 | |
| 19 | ClBr | 140 | 530 | 590 | |
|  | BrI | 90 | 525,590 | 650 | |
| 20 | ClBr | 130 | 530 | 670 | |
|  | BrI | 80 | 520 | 680 | (broad) |
| 21 | ClBr | 140 | 540,590 | 645 | |
|  | BrI | 90 | 590 | 660 | |
| 22 | ClBr | 150 | 460 | 510 | |
| 23 | ClBr | 150 | 520 | 560 | |
|  | BrI | 100 | 515 | 540 | |
| 24 | ClBr | 150 | 585 | 640 | |
|  | BrI | 100 | 585 | 630 | |
| 25 | ClBr | 130 | 550 | 615 | |
|  | BrI | 80 | 550 | 605 | |
| 26 | ClBr | 160 | 585 | 640 | |
|  | BrI | 100 | 580 | 630 | |
| 27 | ClBr | 150 | 510 | 600 | |
|  | BrI | 100 | 510 | 590 | |
| 28 | BrI | 210 | 575 | 620 | |
| 30 | ClBr | 90 | fog | | |
|  | BrI | 30 | 675 | 725 | (fog .50) |
| 32 | ClBr | 80 | fog | | |
|  | BrI | 50 | 580 | 660 | (fog .80) |
| 33 | ClBr | 160 | 520 | 600 | |
|  | BrI | 100 | no def.max. | 620 | |
| 34 | ClBr | 90 | fog | | |
|  | BrI | 40 | 580 | 605 | |
| 35 | ClBr | 160 | no def.max. | 525 | |
|  | BrI | 80 | no def.max. | 540 | |
| 36 | ClBr | 210 | fog | | |
|  | BrI | 110 | 610 | 650 | (fog) |
| 37 | ClBr | 240 | 550 | 620 | (fog) |
|  | BrI | 120 | 550 | 620 | (fog) |

EXAMPLE 39

Three dyes, those of Examples 24, 25 and 26 herein, are added to separate portions of a thioether containing direct print emulsion of the type described in Example 4 of U.S. Pat. No. 3,271,157 in a concentration of 120 mg. per mole of silver. No additional halogen acceptor compound is added. Exposure and photoprocessing are as in Example 1 of U.S. Pat. No. 3,271,157, except that these emulsions, and a fourth portion of the emulsion not containing a halogen acceptor dye, are coated onto cellulose acetate film support and dried to prepare direct print photographic elements.

Each element is then exposed for $10^{-4}$ sec. at a log E max. of 1.05 meter-candle-sec. and thereafter photo-developed for 5 min. at a light intensity of 50 foot candles. The flash exposure is accomplished on a Mk 6 Electronic Flash Sensitometer marketed by the Edgerton, Germenshausen and Grier Corporation and the exposure is through a composite 0.15 log E step tablet having comparable, side-by-side density ranges in neutral, blue and minus blue (yellow). The halogen accepting dyes and sensitometric results are summarized in the following table:

| Dye of Example No. | Dye Conc. mg/mole Ag. | No. of Visible 0.15 log E Steps | | | D min. | D max. | ΔD |
|---|---|---|---|---|---|---|---|
|  |  | Clear | Blue | Minus Blue |  |  |  |
| Control | — | 14 | 9 | 0 | .12 | .23 | .11 |
| 24 | 120 | 12 | 8 | 7 | .17 | .41 | .24 |
| 25 | 120 | 14 | 9 | 9 | .16 | .41 | .25 |
| 26 | 120 | 14 | 10 | 9 | .16 | .36 | .20 |

The data indicate both that the dyes spectrally sensitized the emulsion in the minus blue (yellow) region of the spectrum, and that they operated as halogen acceptors to effectively double the image density range. This composite activity is also accomplished at low concentration levels.

The invention has been described in considerable detail with particular reference to certain preferred embodiments thereof, but it will be understood that variations and modifications can be effected within the spirit and scope of the invention.

We claim:

1. A light-sensitive photographic silver halide emulsion comprising a hydrophilic colloid, silver halide grains and a sensitizing amount of a polymethine dye comprising two terminal nuclei including at least one heterocyclic nucleus having in said nucleus at least one nitrogen atom and optionally containing another atom selected from the group consisting of oxygen, sulfur and selenium, and having the nitrogen atom joined to a polymethine chain intervening said terminal nuclei and including at least one nuclear carbon of said heterocyclic nucleus, said nitrogen atom having substituted thereon a number selected from the group consisting of (A) a member having the formula —$(CH_2)_n$—R wherein:
1. n represents a positive integer of from 2 to 6 and
2. R represents a member selected from the group consisting of:
   a. an acyl radical,
   b. a radical having the formula

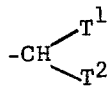

wherein $T^1$ and $T^2$, when taken alone, each represents a member selected from the group consisting of an alkoxy radical and an alkylthio radical, and $T^1$ and $T^2$, when taken together, represent the atoms necessary to complete a cyclic acetal selected from the group consisting of cyclic oxyacetals and cyclic thioacetals containing from 5 to 6 atoms in the heterocyclic acetal ring,
   c. a 1-hydroxy-1-sulfoalkyl radical, and
   d. a 1-hydrazonalkyl radical, and
(B) in dyes having an α-methine carbon atom, a member having the formula —$CH_2$—CH=CH=, linking said nitrogen atom to α-methine carbon atom.

2. A light-sensitive photographic silver halide emulsion comprising a hydrophilic colloid, silver halide grains and a sensitizing amount of a dye selected from the group consisting of those having the formulas:

I.

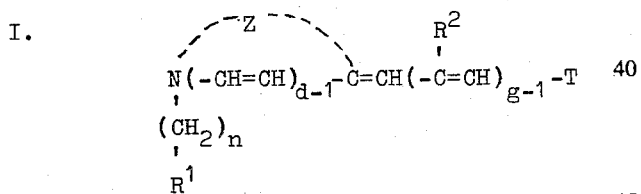

II.

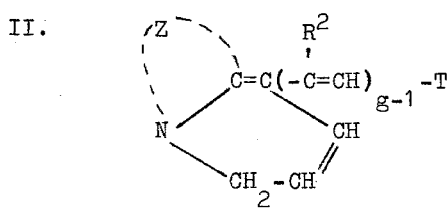

III.

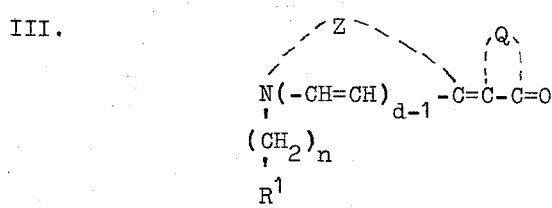

IV.

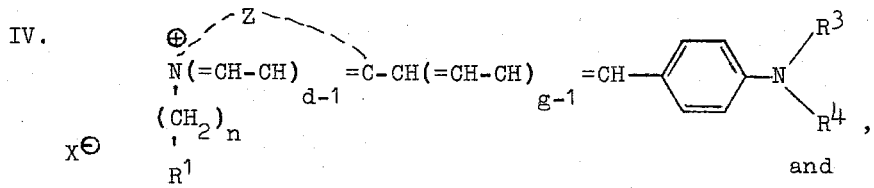

V.

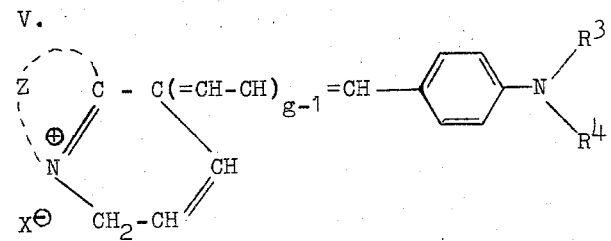

wherein:
a. Z represents the non-metallic atoms necessary to complete a heterocyclic nucleus having in said nucleus at least one atom selected from the group consisting of nitrogen, oxygen, sulfur and selenium,
b. d represents a positive integer having a value of from 1 to 2,
c. n represents a positive integer having a value of from 2 to 6,
d. g represents a positive integer having a value of from 1 to 3,
e. T represents a member selected from the group consisting of:
   1. a heterocyclyl radical comprising a heterocyclic nucleus containing a nitrogen atom having substituted thereon a radical having the formula —$(CH_2)_n$—$R^5$ wherein n is as defined above and $R^5$ is as defined below, and having in said nucleus the additional non-metallic atoms to complete a heterocyclic nucleus as defined for Z above, and
   2. a heterocyclylidenemethyl radical having in the heterocyclic nucleus the non-metallic atoms, including the carbon atom of a keto group, necessary to complete a heterocyclic nucleus,
f. each of $R^5$ and $R^1$ represents a member selected from the group consisting of:
   1. a hydrogen atom,
   2. a hydroxyl radical,
   3. a carboxyl radical,
   4. a cyano radical,
   5. an acyl radical,
   6. an acyloxy radical,
   7. an alkoxy radical,
   8. a radical having the formula

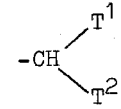

wherein $T^1$ and $T^2$, when taken along, each represents a member selected from an alkylthio radical, and $T^1$ and $T^2$, when taken together, represent the atoms necessary to complete a cyclic acetal selected from the group consisting of cyclic oxyacetals and cyclic thioacetals containing from 5 to 6 atoms in the heterocyclic acetal ring,
   9. a sulfo radical,
   10. an aryl radical,
   11. a 1-hydroxy-1-sulfoalkyl radical, and
   12. a 1-hydrazonalkyl radical, and when the dye molecule is free from an N,α-alkenylene bridge, at least one of $R^5$ and $R^1$ represents a member se-

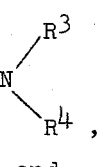

and lected from the group consisting of:
a. an acyl radical,
b. a radical having the formula

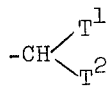

wherein $T^1$ and $T^2$ are as defined above,
c. a 1-hydroxy-1-sulfoalkyl radical, and
d. a 1-hydrazonalkyl radical,
g. each of $R^2$, $R^3$ and $R^4$ represents a member selected from the group consisting of a hydrogen atom, an alkyl radical and an aryl radical,
h. $X^-$ represents an anion, and
i. Q represents the non-metallic atoms necessary to complete a heterocyclic nucleus containing from 5 to 6 atoms in the heterocyclic ring, three or four of said atoms being carbon, and two of said atoms being selected from the group consisting of nitrogen, oxygen and sulfur, at least one of said two atoms being nitrogen.

3. A light-sensitive photographic silver halide emulsion as described in claim 2, wherein in the dye structures I and II, T represents a radical having a formula selected from:

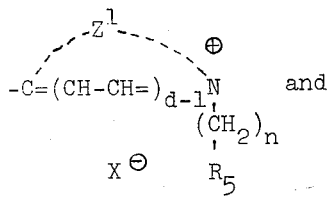

wherein:
a. $d$ represents a positive integer having a value of 1 or 2,
b. Q represents the non-metallic atoms necessary to complete a heterocyclic nucleus containing from 5 to 6 atoms in the heterocyclic ring, three or four of said atoms being carbon, and two of said atoms being selected from the group consisting of nitrogen, oxygen and sulfur, at least one of said two atoms being nitrogen.
c. $X^-$ represents an anion,
d. $R^5$ represents a member selected from the group consisting of:
 1. a hydrogen atom,
 2. a hydroxyl radical,
 3. a carboxyl radical,
 4. a cyano radical,
 5. an acyl radical,
 6. an acyloxy radical,
 7. an alkoxy radical,
 8. a radical having the formula

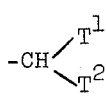

wherein $T^1$ and $T^2$, when taken alone, each represents a member selected from an alkylthio radical, and $T^1$ and $T^2$, when taken together, represent the atoms necessary to complete a cyclic acetal selected from the group consisting of cyclic oxyacetals and cyclic thioacetals containing from 5 to 6 atoms in the heterocyclic acetal ring,
 9. a sulfo radical,
 10. an aryl radical,
 11. a 1-hydroxy-1-sulfoalkyl radical, and
 12. a 1-hydrazonalkyl radical, when the dye molecule contains an N,α-alkenylene bridge;
when the dye molecule is free from an N,α-alkenylene bridge, $R^5$ represents a member selected from the group consisting of:
 1. an acyl radical,
 2. a radical having the formula

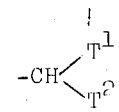

wherein $T^1$ and $T^2$ are as defined above,
 3. a 1-hydroxy-1-sulfoalkyl radical, and
 4. a 1-hydrazonalkyl radical;
e. $Z^1$ represents the non-metallic atoms necessary to complete a heterocyclic nucleus having in said nucleus at least one atom selected from the group consisting of nitrogen, oxygen, sulfur and selenium;
f. Q represents the non-metallic atoms necessary to complete a heterocyclic nucleus containing from 5 to 6 atoms in the heterocyclic ring, three or four of said atoms being selected from the group consisting of nitrogen, oxygen and sulfur, at least one of said two atoms being nitrogen; and
g. $R^6$ represents a member selected from the group consisting of a hydrogen atom, an alkyl radical and an aryl radical.

4. A light-sensitive, photographic silver halide emulsion comprising a hydrophilic colloid, silver halide grains, and a sensitizing amount of a dye having a formula selected from:

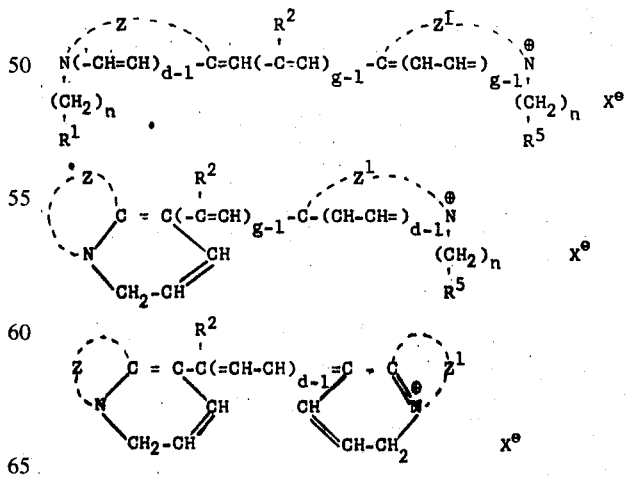

wherein:
a. each of Z and Z¹ represents the non-metallic atoms necessary to complete a heterocyclic nucleus having in said nucleus at least one atom selected from the group consisting of nitrogen, oxygen, sulfur, and selenium,
b. $n$ represents a positive integer having a value of from 2 to 6,
c. $d$ represents a positive integer having a value of from 1 to 2,
d. $g$ represents a positive integer having a value of from 1 to 3,
e. $X^-$ represents an anion,
f. each of $R^1$ and $R^5$ represents a member selected from the group consisting of:
   1. a hydrogen atom,
   2. a hydroxyl radical,
   3. a carboxyl radical,
   4. a cyano radical,
   5. an acyl radical,
   6. an acyloxy radical,
   7. an alkoxy radical,
   8. a radical having the formula

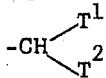

wherein $T^1$ and $T^2$, when taken alone, each represents a member selected from the group consisting of an alkoxy radical and an alkylthio radical, and $T^1$ and $T^2$, when taken together, represent the atoms necessary to complete a cyclic acetal selected from the group consisting of cyclic oxyacetals and cyclic thioacetals containing from 5 to 6 atoms in the heterocyclic acetal ring,
   9. a sulfo radical,
   10. an aryl radical,
   11. a 1-hydroxy-1-sulfoalkyl radical, and
   12. a 1-hydrazonoalkyl radical selected from the group consisting of:
      a 1-(thiosemicarbazono)alkyl radical,
      a 1-(heterocyclylhydrazono)alkyl radical,
      a 1-(phenylhydrazono)alkyl radical,
      a 1-(N-arylcarbamoylhydrazono)alkyl radical and
      a 1-(arylsulfonylhydrazono)alkyl radical, and when the dye molecule is free from an N,α-alkenylene bridge, at least one of $R^1$ and $R^5$ represents a member selected from the group consisting of:
      1. an acyl radical,
      2. a radical having the formula

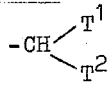

wherein $T^1$ and $T^2$, when taken along, each represents a member selected from the group consisting of an alkoxy radical and an alkylthio radical, and $T^1$ and $T^2$, when taken together, represent the atoms necessary to complete a cyclic acetal selected from the group consisting of cyclic oxyacetals and cyclic thioacetals containing from 5 to 6 atoms in the heterocyclic acetal ring,
      3. a 1-hydroxy-1-sulfoalkyl radical,
      4. a 1-hydrazonoalkyl radical, selected from the group above, and $R^2$ represents a member selected from the group consisting of a hydrogen atom, an alkyl radical and an aryl radical.

5. A light-sensitive photographic silver halide emulsion as described in claim 4 wherein:
a. each of Z and $Z_1$ represents the non-metallic atoms necessary to complete a heterocyclic nucleus selected from the group consisting of an indole nucleus, an imidazole nucleus, an an oxazole nucleus, a thiazole nucleus, a selenazole nucleus and a quinoline nucleus,
b. $n$ has a value of 2, and
c. when the dye molecule is free from an N,α-alkylene bridge at least one of $R^1$ and $R^5$ represents a member selected from the group consisting of:
   1. an acyl radical,
   2. a radical having the formula

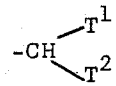

wherein $T^1$ and $T^2$, when taken alone, each represents a member selected from the group consisting of alkoxy radical and an alkylthio radical each having from 1 to 4 carbon atoms, and when taken together, represent the atoms necessary to complete a cyclic acetal radical selected from the group consisting of 1,3-dithiolan-2-yl, 1,3-dioxolan-2-yl, 1,3-dithian-2-yl, and 1,3-dioxan-2-yl,
   3. a 1-hydroxy-1-sulfoalkyl radical selected from the group consisting of 1-hydroxy-1-sulfomethyl and 1-hydroxy-1-sulfoethyl, and
   4. a 1-hydrazonoalkyl radical selected from the group consisting of
      a. a phenylhydrazonomethyl radical,
      b. a p-tolylhydrazonomethyl radical,
      c. a p-sulfophenylhydrazonomethyl radical,
      d. a thiosemicarbazonomethyl radical,
      e. a 2-benzothiazolylhydrazonomethyl radical,
      f. a p-carboxyphenylhydrazonomethyl radical,
      g. a p-tolylsulfohydrazonomethyl radical,
      h. a p-chlorophenylhydrazonomethyl radical,
      i. a p-nitrophenylhydrazonomethyl radical,
      j. an N-phenylcarbamoylhydrazonomethyl radical,
      k. a 2,4-bis(methylsulfonylphenylhydrazonomethyl)radical,
      l. a 2,4-dinitrophenylhydrazonomethyl radical,
      m. a 3-quinolylhydrazonomethyl radical,
      n. a 1-(phenylhydrazono)ethyl radical,
      o. a 1-(phenylhydrazono)propyl radical,
      p. a 1-(p-tolylhydrazono)ethyl radical,
      q. a 1-(2-benzothiazolylhydrazono)propyl radical,
      r. a 1-(N-phenylcarbamoylhydrazono)butyl radical,
      s. a 1-(p-toluenesulfonylhydrazono)ethyl radical, and
      t. a 1-(p-sulfophenylhydrazono)propyl radical.

6. A light-sensitive, photographic silver halide emulsion comprising a hydrophilic colloid, silver halide grains and a sensitizing amount of dye selected from the group consisting of
3-ethyl-3'-(2-formylethyl)oxathiacarbocyanine iodide,
3-ethyl-3'-(2-formylethyl)thiacarbocyanine iodide,
3-(2-acetylethyl)-3'-ethyl-9-methylselenathiacarbocyanine bromide
3-ethyl-3',10-(1,3-propenylene)oxathiacarbocyanine iodide,
3,3'-bis(2-acetylethyl)-9-ethyloxaselenacarbocyanine iodide, 3-ethyl-3',10-(1,3-propenylene)thiacarbocyanine iodide,
3,3'-bis(2-acetylethyl)selenadicarbocyanine bromide,
3'-ethyl-3,8-(1,3-propenylene)-5',6'-benzothiacarbocyanine iodide
3-(2-acetylethyl)-3'-ethylselenathiacyanine iodide,
3,3'-bis(3,3-diethoxypropyl)thiacarbocyanine iodide,
3,3'-bis(2-acetylethyl)selenacarbocyanine bromide,
3,3'-bis(3,3-diethoxypropyl)thiadicarbocyanine perchlorate,
3,3'-bis(2-acetylethyl)thiadicarbocyanine bromide,
3-ethyl-3'-(3,3-diethoxypropyl)-5,6-benzothiacarbocyanine iodide, 1,1'-dimethylnaphth[1,2-d]imidazolocarbocyanine bromide,
1'-ethyl-4'-methyl-3-[3-(p-toluenesulfonylhydrazono)-butyl]thia-2'-cyanine bromide.

8. A light-sensitive, photographic silver halide emulsion comprising a hydrophilic colloid, silver halide grains and a sensitizing amount of a dye having a formula selected from:

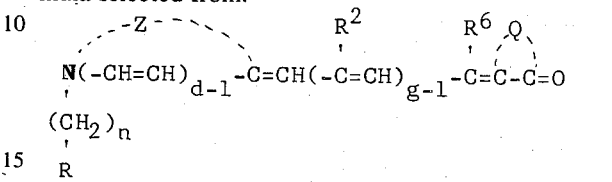

IV. 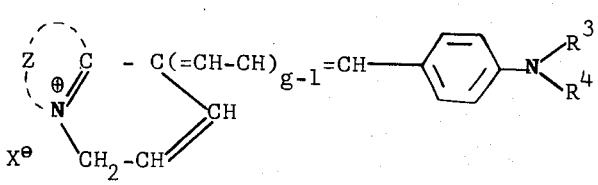, and

V. 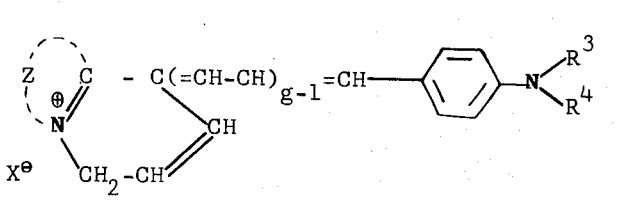

3,3'-bis(2-acetylethyl)thiacarbocyanine bromide,
anhydro-3,3'-bis(3-hydroxy-3-sulfopropyl)thiacarbocyanine hydroxide, monosodium salt,
anhydro-3-ethyl-3'-(3-hydroxy-3-sulfopropyl)-thiacyanine hydroxide, and
anhydro-3-ethyl-3'-(3-hydroxy-3-sulfopropyl)oxathiacarbocyanine hydroxide.

7. A light-sensitive, photographic silver halide emulsion comprising a hydrophilic colloid, silver halide grains and a sensitizing amount of a dye selected from the group consisting of:
3,3'-bis(3-phenylhydrozonopropyl)thiacarbocyanine bromide,
3,3'-bis(3-phenylhydrazonopropyl)thiadicarbocyanine bromide,
3-ethyl-3'-(3-phenylhydrazonopropyl)oxathiacarbocyanine iodide,
3-ethyl-9-methyl-3'-(3-phenylhydrazonopropyl)-thiacarbocyanine bromide,
3-ethyl-3'-(3-thiosemicarbazonopropyl)thiacyanine bromide,
1'-ethyl-3-(3-thiosemicarbazonopropyl)thia-2'-cyanine bromide,
3-ethyl-3'-(3-thiosemicarbazonopropyl)thiacarbocyanine iodide,
3-ethyl-3'-(3-thiosemicarbazonopropyl)oxathiacarbocyanine iodide,
3-ethyl-9-methyl-3'-(3-thiosemicarbazonopropyl)-thiacarbocyanine bromide,
3,3'-bis[3-(2-benzothiazolylhydrazono)propyl]-thiacarbocyanine bromide,
3,9-diphenyl-3'-[3-(2,4-dinitrophenylhydrazono)-propyl]-selenacarbocyanine bromide,
3,3'-bis[3-(phenylcarbamoylhydrazono)butyl]-thiacarbocyanine iodide
3,3'-bis(3-phenylhydrazonopentyl)benz[e]indolo carbocyanine iodide,
3,3'-bis[3-(quinolylhydrazono)propyl]oxathiacarbocyanine bromide,
3-ethyl-3'-[3-(p-chlorophenylhydrazono)butyl]- wherein:
a. Z represents the non-metallic atoms necessary to complete a heterocyclic nucleus having in said nucleus at least one atom selected from the group consisting of nitrogen, oxygen, sulfur and selenium,
b. g represents a positive integer having a value of from 1 to 3,
c. n represents a positive integer having a value of from 2 to 6,
d. R represents a member selected from the group consisting of:
 1. an acyl radical,
 2. a radical having the formula

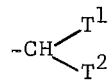

wherein $T^1$ and $T^2$, when taken alone, each represents a member selected from the group consisting of an alkoxy radical and an alkylthio radical, and $T^1$ and $T^2$, when taken together, represent the atoms necessary to complete a cyclic acetal selected from the group consisting of cyclic oxyacetals and cyclic thioacetals containing from 5 to 6 atoms in the heterocyclic acetal ring,
 3. a. 1-hydroxy-1-sulfoalkyl radical, and
 4. a 1-hydrazonoalkyl radical, selected from the group consisting of:
  a 1-(thiosemicarbazono)alkyl radical,
  a 1-(heterocyclylhydrazono)alkyl radical,
  a 1-(phenylhydrazono)alkyl radical,
  a 1-(N-arylcarbamoylhydrazono)alkyl radical, and
  a 1-(arylsulfonylhydrazono)alkyl radical, and
e. each of $R^2$ and $R^6$ represents a member selected from the group consisting of a hydrogen atom, an alkyl radical and an aryl radical, and
f. Q represents the non-metallic atoms necessary to complete a heterocyclic nucleus containing from 5 to 6 atoms in the heterocyclic ring of said nucleus which is selected from the group consisting of a 2- thiazolin-4-one nucleus, a 2-thio-2,4-thiazolidenedione nucleus, a 2-thio-2,5-thiazolidinedione nucleus, a 2-alkylmercapto-2-thiazolin-4-one nucleus, a 4-thiazolidinone nucleus, a 2-alkylphenylamino-2-thiazolin-4-one nucleus, a 2-diphenylamino-2-thiazolin-4-one nucleus, a 2-thiazolin-5-one nucleus, a 2-thio-1,4-oxazolidinedione nucleus, a 2-oxazolin-5-one nucleus, a hydantoin nucleus, a 2-thiohydantoin nucleus, a 2-alkylmercapto-2-imidazolin-5-one nucleus, a thionaphthenone nucleus, a 2-pyrazolin-5-one nucleus, a oxindole nucleus, a barbituric acid and a 2-thiobarbituric acid nucleus.

9. A silver halide emulsion as described in claim 8 wherein, in the dye:
   a. Z represents the non-metallic atoms necessary to complete a heterocyclic nucleus selected from the group consisting of an indole nucleus, an imidazole nucleus, an oxazole, nucleus, a thiazole nucleus, a selenazole nucleus and a quinoline nucleus,
   b. $n$ has a value of 2,
   c. $T^1$ and $T^2$, when taken together, represent the atoms necessary to complete a cyclic acetal radical selected from the group consisting of 1,3-dithiolan-2-yl, 1,3-dioxolan-2-yl, 1,3-dithian-2-yl and 1,3-dioxan-2-yl, and
   d. the hydrazonoalkyl radical represented by R is selected from the group consisting of:

1. a phenylhydrazonomethyl radical,
   2. a p-tolylhydrazonomethyl radical,
   3. a p-sulfophenylhydrazonomethyl radical,
   4. a thiosemicabazonomethyl radical,
   5. a 2-benzothiazolylhydrazonomethyl radical,
   6. a p-carboxyphenylhydrazonomethyl radical,
   7. a p-tolylsulfohydrazonomethyl radical,
   8. a p-chlorophenylhydrazonomethyl radical,
   9. a p-nitrophenylhydrazonomethyl radical,
   10. an N-phenylcarbamoylhydrazonomethyl radical,
   11. a 2,4-bis(methylsulfonyl)phenylhydrazonomethyl radical,
   12. a 2,4-dinitrophenylhydrazonomethyl radical,
   13. a 3-quinolylhydrazonomethyl radical,
   14. a 1-(phenylhydrazono)ethyl radical,
   15. a 1-(phenylhydrazono)propyl radical,
   16. a 1-(p-tolylhydrazono)ethyl radical,
   17. a 1-(2-benzothiazolylhydrazono)propyl radical,
   18. a 1-(N-phenylcarbamoylhydrazono)butyl radical,
   19. a 1-(p-toluenesulfonylhydrazono)ethyl radical, and
   20. a 1-(p-sulfophenylhydrazono)propyl radical.

10. A light-sensitive, photographic silver halide emulsion comprising a hydrophilic colloid, silver halide grains and a sensitizing amount of a dye selected from the group consisting of:
   a. 5-{[3-(3,3-diethoxypropyl)-2-benzothiazolinylidene]ethylidene}-3-ethylrhodanine,
   b. 5-{[3-(2-acetylethyl)-2-benzothiazolinylidene]-ethylidene}-3-ethylrhodanine,
   c. 5-{[3-(2-acetylethyl)-2-benzoselenazolinylidene]ethylidene}-3-ethylrhodanine,
   d. 3-ethyl-5- [3-(3-thiosemicarbazonopropyl)-2-benzothiazolinylidene]-ethylidene -rhodanine,
   e. 3-ethyl-5-[3-(3-phenylhydrazonopropyl)benzothiazolinylidene]ethylidene rhodanine,
   f. 3-ethyl-5-[3-(2-formylethyl)-2-benzoselenazolidene]rhodanine,
   g. 5-[3-(3,3-dimethoxypropyl)-2-benzothiazolinylidene]-3-ethyl-1-phenyl-2-thiohydantoin,
   h. 1,3-diethyl-5-[3-(3-p-sulfophenylhydrazonopropyl)-2-benzothiazolinylidene]-2-thiobarbituric acid, and
   i. 5-[3-(3-hydroxy-3-sulfopropyl)-2-benzothiazolinylidene]-3-phenylrhodanine.

11. A light-sensitive, photographic silver halide emulsion comprising a hydrophilic colloid, silver halide grains and a sensitizing amount of a dye having a formula selected from:

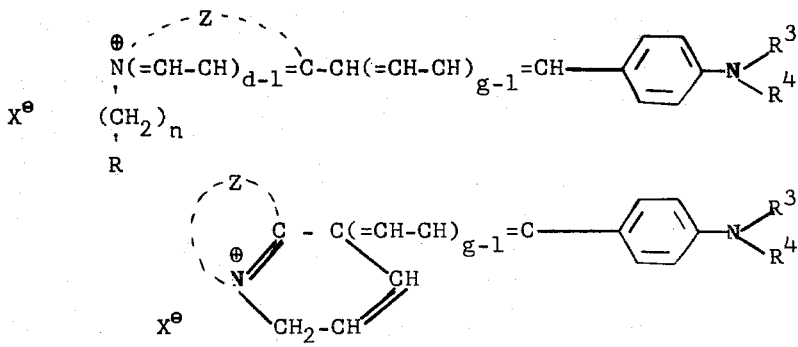

wherein:
   a. Z represents the non-metallic atoms necessary to complete a heterocyclic nucleus having in said nucleus at least one atom selected from the group consisting of nitrogen, oxygen, sulfur and selenium,
   b. $n$ represents a positive integer having a value of from 2 to 6,
   c. $d$ represents a positive integer having a value of from 1 to 2,
   d. $g$ represents a positive integer having a value of from 1 to 2,
   e. X represents an anion,
   f. R represents a member selected from the group consisting of:
      1. a formyl radical,
      2. a radical having the formula

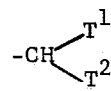

wherein $T^1$ and $T^2$, when taken alone, each represents a member selected from the group consisting of an alkoxy radical and an alkylthio radical each having from 1 to 4 carbon atoms, and when taken together, represent the atoms necessary to complete a cyclic acetal selected from the group consisting of cyclic oxyacetals and cyclic thioacetals containing from 5 to 6 carbon atoms in the heterocyclic acetal ring,
- 3. a 1-hydroxy-1-sulfoalkyl radical, and
- 4. a 1-hydrazonalkyl radical selected from group consisting of:
  - a 1-(thiosemicarbazono)alkyl radical,
  - a 1-(heterocyclylhydrazono)alkyl radical,
  - a 1-(phenylhydrazono)alkyl radical,
  - a 1-(N-arylcarbamoylhydrazono)alkyl radical and
  - a 1-(arylsulfonylhydrazono)alkyl radical, and
- g. each of $R^3$ and $R^4$ represents a member selected from the group consisting of a hydrogen atom, an alkyl radical and an aryl radical.

12. A photographic emulsion as described in claim 11 wherein, in the dye:
- a. Z represents the non-metallic atoms necessary to complete a heterocyclic nucleus selected from the group consisting of an indole nucleus, an imidazole nucleus, an oxazole nucleus, a thiazole nucleus, a selenazole nucleus and a quinoline nucleus,
- b. $n$ has a value of 2, and
- c. $T^1$ and $T^2$, when taken together, represent the atoms necessary to complete a cyclic acetal radical selected from the group consisting of 1,3-dithiolan-2-yl, 1,3-dioxolan-2-yl, 1,3-dithian-2-yl, and 1,3-dioxan-2-yl, and
- d. the 1-hydrazonoalkyl radical represented by R is selected from the group consisting of:
  1. a phenylhydrazonomethyl radical,
  2. a p-tolylhydrazonomethyl radical,
  3. a p-sulfophenylhydrazonomethyl radical,
  4. a thiosemicarbazonomethyl radical,
  5. a 2-benzothiazolylhydrazonomethyl radical,
  6. a p-carboxyphenylhydrazonomethyl radical,
  7. a p-tolylsulfohydrazonomethyl radical,
  8. a p-chlorophenylhydrazonomethyl radical,
  9. a p-nitrophenylhydrazonomethyl radical,
  10. an N-phenylcarbamoylhydrazonomethyl radical,
  11. a 2,4-bis(methylsulfonyl)phenylhydrazonomethyl radical,
  12. a 2,4-dinitrophenylhydrazonomethyl radical,
  13. a 3-quinolylhydrazonomethyl radical,
  14. a 1-(phenylhydrazono)ethyl radical,
  15. a 1-(phenylhydrazono)propyl radical,
  16. a 1-(p-tolylhydrazono)ethyl radical,
  17. a 1-(2-benzothiazolylhydrazono)propyl radical,
  18. a 1-(N-phenylcarbamoylhydrazono)butyl radical,
  19. a 1-(p-toluenesulfonylhydrazono)ethyl radical, and
  20. a 1-(p-sulfophenylhydrazono)propyl radical.

13. A light-sensitive photographic silver halide emulsion comprising a hydrophilic colloid, silver halide grains and a sensitizing amount of a dye selected from the group consisting of:
- a. a 3-(3,3-diethoxypropyl)-2-p-dimethylaminostyrylbenzothiazolium salt,
- b. a 3-(2-acetylethyl)-2-p-dimethylaminostyrylbenzothiazolium salt,
- c. an anhydro-3-(3-hydroxy-3-sulfopropyl)-2-p-dimethylaminostyrylbenzothiazolium salt,
- d. an anhydro-2-p-dimethylaminostyryl-3-(3-hydroxy-3-sulfopropyl)benzothiazolium salt,
- e. a 3-(2-acetylethyl)-2-p-dimethylaminostyrylbenzoselenazolium salt,
- f. a 2-p-dimethylaminostyryl-3-(3-thiosemicarbazonopropyl)benzothiazolium salt, and
- g. a 2-p-dimethylaminostyryl-3-(3-phenylhydrazono)-benzothiazolium salt.

14. A light-sensitive silver halide emulsion comprising silver halide grains having a predominant amount of radiation sensitivity in the internal portion of said grains and from 50 to 400 mg. per mole of silver based on said silver halide of a composite sensitizing dye-halogen acceptor having a formula selected from:

$$\overset{\frown{\;Z\;}}{N(-CH=CH)_{d-1}}\overset{R^2}{-\overset{|}{C}}=CH(-C=CH)_{g-1}-T$$
$$\underset{R}{\overset{|}{(CH_2)_n}}$$

$$\overset{\frown{Z}}{\underset{N}{\diagdown}}\overset{R^2}{\underset{}{C}}=C(-C=CH)_{g-1}-T^3$$
$$\underset{CH_2-CH}{\diagup CH}$$

$$\overset{\frown{\;Z\;}}{N(-CH=CH)_{d-1}}-C=\overset{Q}{\overset{|}{C}}-\overset{}{C}=O$$
$$\underset{R^8}{}$$

$$X^\ominus \quad \overset{\oplus\frown{\;Z\;}}{N(=CH-CH)_{d-1}}=C=CH(=CH-CH)_{g-1}-CH-\underset{}{\bigcirc}-N\overset{R^3}{\underset{R^4}{}}$$
$$\underset{R^8}{\overset{|}{(CH_2)_n}}$$

wherein:
- Z represents the non-metallic atoms necessary to complete a heterocyclic nucleus having in said nucleus at least one atom selected from the group consisting of nitrogen, oxygen, sulfur and selenium,
- b. $d$ represents a positive integer having a value of from 1 to 2,
- c. $n$ represents a positive integer having a value of from 2 to 6,
- d. $g$ represents a positive integer having a value of from 1 to 2,
- e. T represents a member selected from the group consisting of:
  1. a heterocyclyl radical comprising a heterocyclic nucleus containing a chromophoric nitrogen atom having substituted thereon a radical having the formula: $-(CH_2)_n-R^5$ wherein $n$ is a positive integer having a value of from 2 to 6 and $R^5$ is as defined below, and having in said nucleus the additional non-metallic atoms to complete a heterocyclic nucleus of the type used in cyanine dyes, and
  2. a heterocyclylidenemethyl radical having in the heterocyclic nucleus the non-metallic atoms, including the carbon atom of a keto group necessary to complete a heterocyclic nucleus,
- f. each of R and $R^5$ represents a member selected from the group consisting of:
  1. a hydrogen atom, 2. a hydroxyl radical,
3. a carboxyl radical,
4. a cyano radical,
5. an acyl radical,
6. an acyloxy radical,
7. an alkoxy radical,
8. a radical having the formula

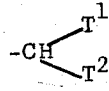

wherein $T^1$ and $T^2$, when taken alone, each represents a member selected from the group consisting of an alkoxy radical and an alkylthio radical, and $T^1$ and $T^2$, when taken together, represent the atoms necessary to complete a cyclic acetal selected from the group consisting of cyclic oxyacetals and cyclic thioacetals containing from 5 to 6 atoms in the heterocyclic acetal ring,
9. a sulfo radical,
10. an aryl radical,
11. a 1-hydroxy-1-sulfoalkyl radical, and
12. a 1-hydrazonoalkyl radical, and at least one of R and $R^5$ represents a 1-hydrazonoalkyl radical, g. $R^2$, $R^3$ and $R^4$ each represents a member selected from the group consisting of a hydrogen atom, an alkyl radical and an aryl radical, h. $R^8$ represents a 1-hydrazonoalkyl radical, i. $X^-$ represents an anion, j. Q represents the non-metallic atoms necessary to complete a heterocyclic nucleus containing from 5 to 6 atoms in the heterocyclic ring, three or four of said atoms being carbon, and two of said atoms being selected from the group consisting of nitrogen, oxygen and sulfur, at least one of said two atoms being nitrogen, and k. $T^3$ represents a radical having the formula:

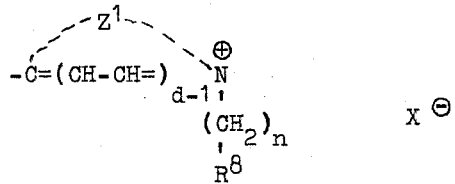

wherein:
$Z^1$ represents the non-metallic atoms previously defined as represented by Z, and each of $d$, $n$, $R^8$ and $X^-$ are as previously defined.

15. A light-sensitive emulsion as described in claim 14 wherein the emulsion is a light-developable, direct print emulsion.

16. A light-developable, direct-print, radiation-sensitive silver halide emulsion as described in claim 15, wherein the 1-hydrazonoalkyl radical is selected from the group consisting of:
a 1-(thiosemicarbazono)alkyl radical,
a 1-(heterocyclylhydrazono)alkyl radical,
a 1-(phenylhydrazono)radical,
a 1-(N-arylcarbamoylhydrazono)alkyl radical and
a 1-(arylsulfonylhydrazono)alkyl radical.

17. A light-developable, direct print, radiation sensitive silver halide emulsion as described in claim 16 wherein the 1-hydrazonoalkyl radical is selected from the group consisting of:
1. a phenylhydrazonomethyl radical,
2. a p-tolylhydrazonomethyl radical,
3. a p-sulfophenylhydrazonomethyl radical,
4. a thiosemicarbazonomethyl radical,
5. a 2-benzothiazolylhydrazonomethyl radical,
6. a p-carboxyphenylhydrazonomethyl radical,
7. a p-tolylsulfohydrazonomethyl radical,
8. a p-chlorophenylhydrazonomethyl radical,
9. a p-nitrophenylhydrazonomethyl radical,
10. an N-phenylcarbamoylhydrazonomethyl radical,
11. a 2,4-bis(methylsulfonyl)phenylhydrazonomethyl radical,
12. a 2,4-dinitrophenylhydrazonomethyl radical,
13. a 3-quinolylhydrazonomethyl radical,
14. a 1-(phenylhydrazono)ethyl radical,
15. a 1-(phenylhydrazono)propyl radical,
16. a 1(p-tolylhydrazono)ethyl radical,
17. a 1-(2-benzothiazolylhydrazono)propyl radical,
18. a 1-(N-phenylcarbamoylhydrazono)butyl radical,
19. a 1-(p-toluenesulfonylhydrazono)ethyl radical, and
20. a 1-(p-sulfophenylhydrazono)propyl radical.

* * * * *